United States Patent
Khoshnevisan et al.

(10) Patent No.: US 11,889,479 B2
(45) Date of Patent: Jan. 30, 2024

(54) TIME DIVISION MULTIPLEXING MAPPING OF TRANSMISSION CONFIGURATION INDICATOR STATES TO A CONTROL CHANNEL

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US); Jing Sun, San Diego, CA (US); Arumugam Chendamarai Kannan, San Diego, CA (US); Sungwoo Park, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 17/118,970

(22) Filed: Dec. 11, 2020

(65) Prior Publication Data
US 2021/0227525 A1    Jul. 22, 2021

Related U.S. Application Data

(60) Provisional application No. 62/962,017, filed on Jan. 16, 2020.

(51) Int. Cl.
*H04W 72/04* (2023.01)
*H04W 72/044* (2023.01)
(Continued)

(52) U.S. Cl.
CPC ........ *H04W 72/044* (2013.01); *H04B 7/2615* (2013.01); *H04L 5/0053* (2013.01); *H04L 25/0204* (2013.01); *H04W 72/23* (2023.01)

(58) Field of Classification Search
CPC .............. H04W 72/044; H04L 5/0053; H04L 25/0204; H04B 7/2615
(Continued)

(56) References Cited

U.S. PATENT DOCUMENTS

2019/0281587 A1\* 9/2019 Zhang .................. H04W 72/23
2019/0335492 A1\* 10/2019 Venugopal ............ H04W 72/51
(Continued)

FOREIGN PATENT DOCUMENTS

EP          3678317 A1 \*  7/2020  .......... H04B 7/0456
WO    WO-2019031787 A1 \*  2/2019  .......... H04B 7/0456

OTHER PUBLICATIONS

International Search Report and Written Opinion—PCT/US2020/064890—ISA/EPO—dated Mar. 16, 2021 (201503WO).

*Primary Examiner* — Christopher M Crutchfield
*Assistant Examiner* — Jean F Voltaire
(74) *Attorney, Agent, or Firm* — Holland & Hart LLP

(57) ABSTRACT

Methods, systems, and devices for wireless communications are described. In some wireless communications systems, a base station may transmit a control channel such as a PDCCH using one or more control resource sets (CORESETs). A CORESET may be associated with a number of different transmission configuration indicator (TCI) states which may specify information that a UE may use to receive the PDCCH. In some cases, the UE may identify an association between resources of the CORESET and a number of TCI states assigned to a CORESET using various different multiplexing techniques, such as time division multiplexing (TDM). Some associations between the resources of the CORESET and the TCI states may include a mapping of the resources of the CORESET to the different TCI states. The UE may decode the PDCCH based on the different TDM techniques used to configure the CORESET.

29 Claims, 23 Drawing Sheets

(51) Int. Cl.
  *H04L 5/00*    (2006.01)
  *H04B 7/26*    (2006.01)
  *H04L 25/02*   (2006.01)
  *H04W 72/23*   (2023.01)

(58) Field of Classification Search
  USPC .......................................................... 370/330
  See application file for complete search history.

(56) References Cited

U.S. PATENT DOCUMENTS

2020/0053757 A1\* 2/2020 Bagheri ................ H04L 5/0007
2020/0153581 A1\* 5/2020 Tsai ...................... H04W 24/10
2021/0076388 A1\* 3/2021 Miao ..................... H04W 72/53
2021/0266128 A1\* 8/2021 Zhang ................... H04W 24/10

\* cited by examiner

TIME DIVISION MULTIPLEXING MAPPING OF TRANSMISSION CONFIGURATION INDICATOR STATES TO A CONTROL CHANNEL

CROSS REFERENCE

The present application for patent claims the benefit of U.S. Provisional patent Application No. 62/962,017 by KHOSHNEVISAN et al., entitled "TIME DIVISION MULTIPLEXING MAPPING OF TRANSMISSION CONFIGURATION INDICATOR STATES TO A CONTROL CHANNEL," filed Jan. 16, 2020, assigned to the assignee hereof, and expressly incorporated by reference herein.

FIELD OF TECHNOLOGY

The following relates generally to wireless communications and more specifically to time division multiplexing mapping of transmission configuration indicator states to a control channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a device may attempt to decode a control channel in a control resource set (CORESET) and may perform channel estimation to identify channel characteristics associated with the control channel. In some cases, the device may attempt to decode and perform channel estimation of the control channel based on a transmission configuration indicator (TCI) state associated with the control channel. In some cases, however, information provided by a single TCI state may be insufficient.

SUMMARY

The described techniques relate to improved methods, systems, devices, and apparatuses that support time division multiplexing mapping of transmission configuration indicator (TCI) states to a control channel. Generally, the described techniques provide for assigning more than one TCI state to a control resource set (CORESET). In some wireless communications systems, a base station or other transmitting device may transmit information in a control channel such as a physical downlink control channel (PDCCH) using one or more CORESETs.

A CORESET may be associated with a number of different TCI states which may specify information related to beam management, antenna port configuration, quasi co-location information for transmissions, etc., which a user equipment (UE) may use to receive the PDCCH. In some cases, the UE may receive a configuration message that indicates information for the CORESET. In some cases, the UE may identify an association between resources of the CORESET (e.g., an association between time-frequency resources, orthogonal frequency division multiplexing (OFDM) symbols, or resource element configurations of the CORESET) and a number of TCI states assigned to a CORESET using various multiplexing techniques, such as time division multiplexing (TDM). Some associations between the resources of the CORESET and the TCI states may include a mapping of the resources of the CORESET to the different TCI states. The UE may decode the PDCCH based on the different TDM techniques.

A method of wireless communications at a UE is described. The method may include receiving a configuration message indicating that a control resource set for a downlink control channel is associated with a set of TCI (TCI) states, identifying an association between resources of the control resource set and the set of TCI states based on a time division multiplexing mapping, and decoding the downlink control channel based on the time division multiplexing mapping.

An apparatus for wireless communications at a UE is described. The apparatus may include a processor, memory coupled with the processor, and instructions stored in the memory. The instructions may be executable by the processor to cause the apparatus to receive a configuration message indicating that a control resource set for a downlink control channel is associated with a set of TCI states, identify an association between resources of the control resource set and the set of TCI states based on a time division multiplexing mapping, and decode the downlink control channel based on the time division multiplexing mapping.

Another apparatus for wireless communications at a UE is described. The apparatus may include means for receiving a configuration message indicating that a control resource set for a downlink control channel is associated with a set of TCI states, identifying an association between resources of the control resource set and the set of TCI states based on a time division multiplexing mapping, and decoding the downlink control channel based on the time division multiplexing mapping.

A non-transitory computer-readable medium storing code for wireless communications at a UE is described. The code may include instructions executable by a processor to receive a configuration message indicating that a control resource set for a downlink control channel is associated with a set of TCI states, identify an association between resources of the control resource set and the set of TCI states based on a time division multiplexing mapping, and decode the downlink control channel based on the time division multiplexing mapping.

In some examples of the method, apparatuses, and non-transitory computer-readable medium described herein, identifying the association between resources of the control resource set and the set of TCI states may include operations, features, means, or instructions for identifying that the time division multiplexing mapping includes a first set of control channel element indices first association between a first set of orthogonal frequency division multiplexing (OFDM) symbols of the control resource set and a first TCI state of the set of TCI states, and a second association between a second set of OFDM symbols of the control resource set and a second TCI state of the set of TCI states.

Some examples of the method, apparatuses, and non-transitory computer-readable medium described herein may further include operations, features, means, or instructions for identifying that the resources of the control resource set include a set of resource element group bundles spanning the set of OFDM symbols where each resource element group bundle of the set of resource element group bundles includes one or more sub-resource element group bundles, each of the one or more sub-resource element group bundles being associated with one of the first TCI state or the second TCI state.

Some examples of the method, apparatuses, and non-transitory computer-readable medium described herein may further include operations, features, means, or instructions for identifying one or more resource element groups including a sub-resource element group bundle of the one or more sub-resource element group bundles, identifying that a precoding may be common to the one or more resource element groups in the sub-resource element group bundle, and performing a channel estimation for a PDCCH candidate in the control resource set based on the identifying.

Some examples of the method, apparatuses, and non-transitory computer-readable medium described herein may further include operations, features, means, or instructions for receiving control signaling including a bitmap indicating the first association between the first set of OFDM symbols of the control resource set and the first TCI state and the second association between the second set of OFDM symbols of the control resource set and the second TCI state.

In some examples of the method, apparatuses, and non-transitory computer-readable medium described herein, the bitmap may have a length equal to a duration of the control resource set.

Some examples of the method, apparatuses, and non-transitory computer-readable medium described herein may further include operations, features, means, or instructions for receiving control information identifying a configuration for the control resource set including a number of the OFDM symbols for the first TCI state, a number of the OFDM symbols for the second TCI state, a number of symbols for switching from the first TCI state to the second TCI state, or a combination thereof.

In some examples of the method, apparatuses, and non-transitory computer-readable medium described herein, the first set of OFDM symbols include a first half of a total number of OFDM symbols of the control resource set, and the second set of OFDM symbols include a second half of the total number of OFDM symbols of the control resource set.

In some examples of the method, apparatuses, and non-transitory computer-readable medium described herein, the first set of OFDM symbols include a first portion of a total number of resource element group bundles of the control resource set, and the second set of OFDM symbols include a second portion of the total number of resource element group bundles of the control resource set.

Some examples of the method, apparatuses, and non-transitory computer-readable medium described herein may further include operations, features, means, or instructions for indexing both the first portion of resource element groups and the second portion of resource element groups in a frequency-first, time-second manner.

In some examples of the method, apparatuses, and non-transitory computer-readable medium described herein, each resource element group bundle from the first portion of resource element group bundles and the second portion of resource element group bundles include a number of consecutive resource element groups.

Some examples of the method, apparatuses, and non-transitory computer-readable medium described herein may further include operations, features, means, or instructions for indexing one or more resource element groups from the first set of resource element groups up to a threshold number of resource element groups, and continuing to index one or more resource element groups from the second set of resource element groups, wherein the indexing of the second set of resource element groups is continued from the indexing of the first set of resource element groups.

In some examples of the method, apparatuses, and non-transitory computer-readable medium described herein, the threshold number includes a number of resource element groups in each resource element group bundle from the first set of resource element group bundles or the second set of resource element group bundles.

In some examples of the method, apparatuses, and non-transitory computer-readable medium described herein, identifying the association between resources of the control resource set and the set of TCI states may include operations, features, means, or instructions for identifying that the control resource set may be organized into two parts, where the first association may be between a first set of consecutive OFDM symbols and a first part of the control resource set, and where the second association may be between a second set of consecutive OFDM symbols and a second part of the control resource set.

In some examples of the method, apparatuses, and non-transitory computer-readable medium described herein, the first set of consecutive OFDM symbols and the second set of consecutive OFDM symbols may have the same length.

Some examples of the method, apparatuses, and non-transitory computer-readable medium described herein may further include operations, features, means, or instructions for receiving control signaling indicating configuration information for the control resource set, and applying the time division multiplexing mapping independently across the first part of the control resource set and the second part of the control resource set based on the configuration information.

In some examples of the method, apparatuses, and non-transitory computer-readable medium described herein, the configuration information further includes a symbol duration and a symbol gap configured for the control resource set.

Some examples of the method, apparatuses, and non-transitory computer-readable medium described herein may further include operations, features, means, or instructions for identifying a control channel element-to-resource element group bundle mapping between a set of control channel elements, a first set of resource element group bundles included in the first part of the control resource set, a second set of resource element group bundles included in the second part of the control resource set, or a combination thereof.

In some examples of the method, apparatuses, and non-transitory computer-readable medium described herein, the mapping further may include operations, features, means, or instructions for identifying an interleaving configuration for the control channel element-to-resource element group bundle mapping for the control resource set, and applying the control channel element-to-resource element group bundle mapping independently across the first part of the control resource set and the second part of the control resource set.

Some examples of the method, apparatuses, and non-transitory computer-readable medium described herein may further include operations, features, means, or instructions for identifying an aggregation level for a PDCCH candidate associated with the first part of the control resource set or the second part of the control resource set, and identifying a set of indices for the set of control channel elements based on the PDCCH candidate.

Some examples of the method, apparatuses, and non-transitory computer-readable medium described herein may further include operations, features, means, or instructions for identifying a first index of the set of indices may be associated with the first part of the control resource set, where the first index corresponds to a second index of the set of indices that may be associated with the second part of the control resource set.

In some examples of the method, apparatuses, and non-transitory computer-readable medium described herein, the number of control channel elements associated with the first part of the control resource set and the second part of the control resource set may be based on the aggregation level from the PDCCH candidate.

Some examples of the method, apparatuses, and non-transitory computer-readable medium described herein may further include operations, features, means, or instructions for identifying a set of coded bits for a PDCCH candidate rate matching based on a first set of control channel elements of the PDCCH candidate included in the first part and a second set of control channel elements of the PDCCH candidate included in the second part.

Some examples of the method, apparatuses, and non-transitory computer-readable medium described herein may further include operations, features, means, or instructions for Identifying the set of coded bits may be based on the number of control channel elements in the first set of control channel elements only, mapping the set of coded bits to a first set of control channel element indices associated with the PDCCH candidate according to the first part of the control resource set, and mapping the set of coded bits to the second set of control channel element indices associated with the PDCCH candidate according to the second part of the control resource set.

Some examples of the method, apparatuses, and non-transitory computer-readable medium described herein may further include operations, features, means, or instructions for Identifying the set of coded bits may be based on the number of control channel elements in both the first set of control channel elements and the second set of control channel elements, mapping a first portion of the set of coded bits to a first set of control channel element indices associated with the PDCCH candidate according to the first part of the control resource set, and mapping a second portion of the set of coded bits to the second set of control channel element indices associated with the PDCCH candidate according to the second part of the control resource set.

In some examples of the method, apparatuses, and non-transitory computer-readable medium described herein, the configuration message includes a radio resource control message.

A method of wireless communications at a base station is described. The method may include identifying an association between resources of the control resource set and the set of TCI states based on a time division multiplexing mapping and transmitting a configuration message indicating that the control resource set is associated with the set of TCI states.

An apparatus for wireless communications at a base station is described. The apparatus may include a processor, memory coupled with the processor, and instructions stored in the memory. The instructions may be executable by the processor to cause the apparatus to identify an association between resources of the control resource set and the set of TCI states based on a time division multiplexing mapping and transmit a configuration message indicating that the control resource set is associated with the set of TCI states.

Another apparatus for wireless communications at a base station is described. The apparatus may include means for identifying an association between resources of the control resource set and the set of TCI states based on a time division multiplexing mapping and transmitting a configuration message indicating that the control resource set is associated with the set of TCI states.

A non-transitory computer-readable medium storing code for wireless communications at a base station is described. The code may include instructions executable by a processor to identify an association between resources of the control resource set and the set of TCI states based on a time division multiplexing mapping and transmit a configuration message indicating that the control resource set is associated with the set of TCI states.

In some examples of the method, apparatuses, and non-transitory computer-readable medium described herein, identifying the association between resources of the control resource set and the set of TCI states may include operations, features, means, or instructions for identifying that the time division multiplexing mapping includes a first association between a first set of orthogonal frequency division multiplexing (OFDM) symbols of the control resource set and a first TCI state of the set of TCI states, and a second association between a second set of OFDM symbols of the control resource set and a second TCI state of the set of TCI states.

Some examples of the method, apparatuses, and non-transitory computer-readable medium described herein may further include operations, features, means, or instructions for identifying that the resources of the control resource set include a set of resource element group bundles spanning the set of OFDM symbols where each resource element group bundle of the set of resource element group bundles includes one or more sub-resource element group bundles, each of the one or more sub-resource element group bundles being associated with one of the first TCI state or the second TCI state.

Some examples of the method, apparatuses, and non-transitory computer-readable medium described herein may further include operations, features, means, or instructions for identifying one or more resource element groups including a sub-resource element group bundle of the one or more sub-resource element group bundles, identifying that a precoding may be common to the one or more resource element groups in the sub-resource element group bundle, and performing a channel estimation for a PDCCH candidate in the control resource set based on the identifying.

Some examples of the method, apparatuses, and non-transitory computer-readable medium described herein may further include operations, features, means, or instructions for transmitting control signaling including a bitmap indicating the first association between the first set of OFDM symbols of the control resource set and the first TCI state and the second association between the second set of OFDM symbols of the control resource set and the second TCI state.

In some examples of the method, apparatuses, and non-transitory computer-readable medium described herein, the bitmap may have a length equal to a duration of the control resource set.

Some examples of the method, apparatuses, and non-transitory computer-readable medium described herein may further include operations, features, means, or instructions for transmitting control signaling identifying a configuration for the control resource set including a number of the OFDM symbols for the first TCI state, a number of the OFDM symbols for the second TCI state, a number of symbols for switching from the first TCI state to the second TCI state, or a combination thereof.

In some examples of the method, apparatuses, and non-transitory computer-readable medium described herein, the first set of OFDM symbols include a first half of a total number of OFDM symbols of the control resource set, and the second set of OFDM symbols include a second half of the total number of OFDM symbols of the control resource set.

In some examples of the method, apparatuses, and non-transitory computer-readable medium described herein, the first set of OFDM symbols include a first portion of a total number of resource element group bundles of the control resource set, and the second set of OFDM symbols include a second portion of the total number of resource element group bundles of the control resource set.

Some examples of the method, apparatuses, and non-transitory computer-readable medium described herein may further include operations, features, means, or instructions for indexing both the first portion of resource element groups and the second portion of resource element groups in a frequency-first, time-second manner.

In some examples of the method, apparatuses, and non-transitory computer-readable medium described herein, each resource element group bundle from the first portion of resource element group bundles and the second portion of resource element group bundles include a number of consecutive resource element groups.

Some examples of the method, apparatuses, and non-transitory computer-readable medium, the first set of OFDM symbols comprise a first set of resource element groups and the second set of OFDM symbols comprise a second det of resource element groups, where the techniques described herein may further include operations, features, means, or instructions for indexing one or more resource element groups from the first set of resource element groups up to a threshold number of resource element groups, and continuing to index one or more resource element groups from the second set of resource element groups.

In some examples of the method, apparatuses, and non-transitory computer-readable medium described herein, the threshold number includes a number of resource element groups in each resource element group bundle from the first set of resource element group bundles or the second set of resource element group bundles.

In some examples of the method, apparatuses, and non-transitory computer-readable medium described herein, identifying the association between resources of the control resource set and the set of TCI states may include operations, features, means, or instructions for identifying that the control resource set may be organized into two parts, where the first association may be between a first set of consecutive OFDM symbols and a first part of the control resource set, and where the second association may be between a second set of consecutive OFDM symbols and a second part of the control resource set.

In some examples of the method, apparatuses, and non-transitory computer-readable medium described herein, the first set of consecutive OFDM symbols and the second set of consecutive OFDM symbols may have the same length.

Some examples of the method, apparatuses, and non-transitory computer-readable medium described herein may further include operations, features, means, or instructions for transmitting control signaling indicating configuration information for the control resource set, and applying the time division multiplexing mapping independently across the first part of the control resource set and the second part of the control resource set based on the configuration information.

In some examples of the method, apparatuses, and non-transitory computer-readable medium described herein, the configuration information further includes a symbol duration and a symbol gap configured for the control resource set.

Some examples of the method, apparatuses, and non-transitory computer-readable medium described herein may further include operations, features, means, or instructions for identifying a control channel element-to-resource element group bundle mapping between a set of control channel elements, a first set of resource element group bundles included in the first part of the control resource set, a second set of resource element group bundles included in the second part of the control resource set, or a combination thereof.

In some examples of the method, apparatuses, and non-transitory computer-readable medium described herein, the mapping further may include operations, features, means, or instructions for identifying an interleaving configuration for the control channel element-to-resource element group bundle mapping for the control resource set, and applying the control channel element-to-resource element group bundle mapping independently across the first part of the control resource set and the second part of the control resource set.

Some examples of the method, apparatuses, and non-transitory computer-readable medium described herein may further include operations, features, means, or instructions for identifying an aggregation level for a PDCCH candidate associated with the first part of the control resource set or the second part of the control resource set, and identifying a set of indices for the set of control channel elements based on the PDCCH candidate.

Some examples of the method, apparatuses, and non-transitory computer-readable medium described herein may further include operations, features, means, or instructions for identifying a first index of the set of indices may be associated with the first part of the control resource set, where the first index corresponds to a second index of the set of indices that may be associated with the second part of the control resource set.

In some examples of the method, apparatuses, and non-transitory computer-readable medium described herein, the number of control channel elements associated with the first part of the control resource set and the second part of the control resource set may be based on the aggregation level from the PDCCH candidate.

Some examples of the method, apparatuses, and non-transitory computer-readable medium described herein may further include operations, features, means, or instructions for identifying a set of coded bits for a PDCCH candidate rate matching based on a first set of control channel elements of the PDCCH candidate included in the first part and a second set of control channel elements of the PDCCH candidate included in the second part.

Some examples of the method, apparatuses, and non-transitory computer-readable medium described herein may further include operations, features, means, or instructions for identifying the set of coded bits may be based on the number of control channel elements in the first set of control channel elements only, mapping the set of coded bits to a first set of control channel element indices associated with the PDCCH candidate according to the first part of the control resource set, and mapping the set of coded bits to the second set of control channel element indices associated with the PDCCH candidate according to the second part of the control resource set.

Some examples of the method, apparatuses, and non-transitory computer-readable medium described herein may further include operations, features, means, or instructions for identifying the set of coded bits may be based on the number of control channel elements in both the first set of control channel elements and the second set of control channel elements, mapping a first portion of the set of coded bits to a first set of control channel element indices associated with the PDCCH candidate according to the first part of the control resource set, and mapping a second portion of the set of coded bits to the second set of control channel element indices associated with the PDCCH candidate according to the second part of the control resource set.

In some examples of the method, apparatuses, and non-transitory computer-readable medium described herein, the configuration message includes a radio resource control message.

DETAILED DESCRIPTION

Figure 1:
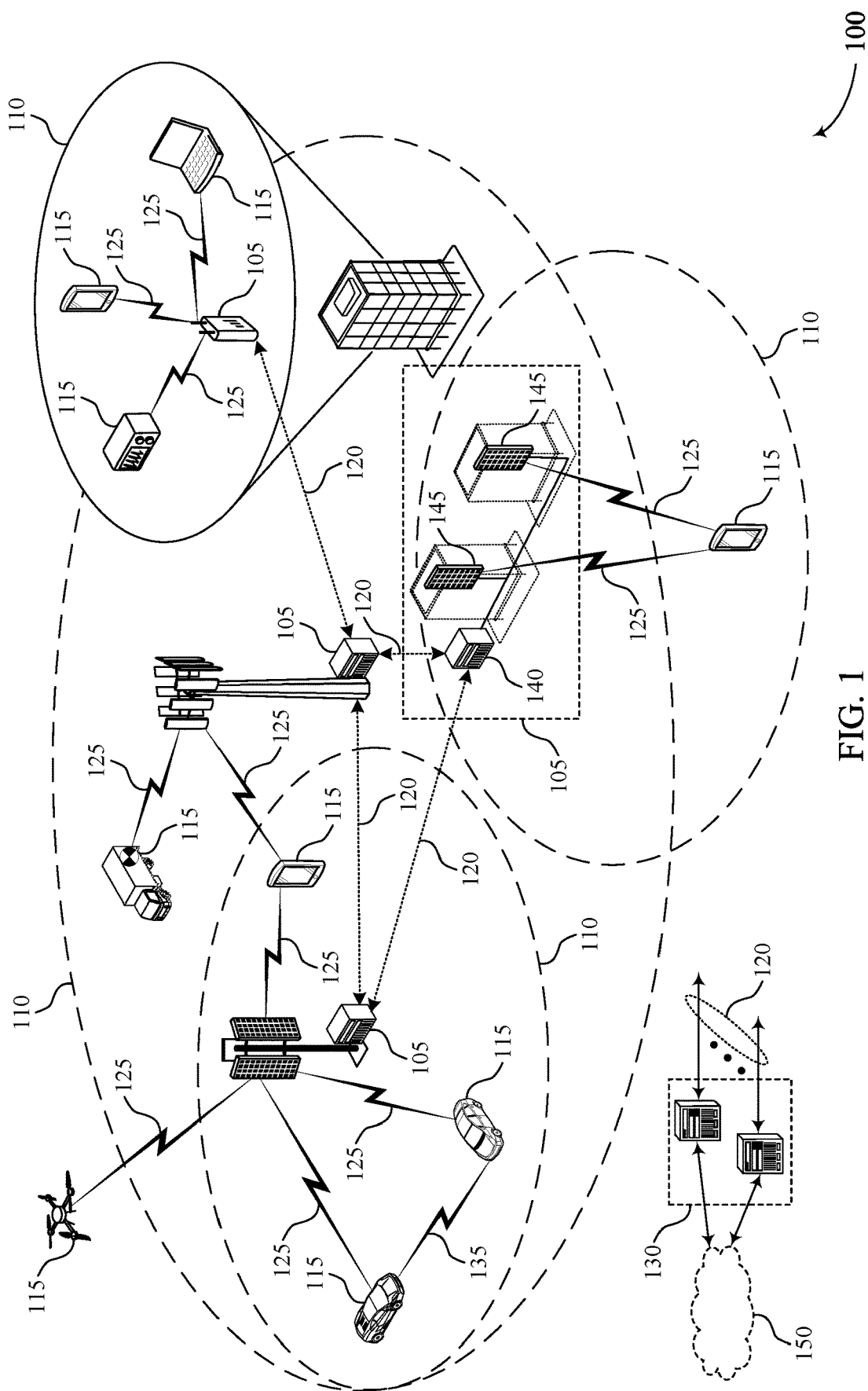
FIG. 1 illustrates an example of a wireless communications system that supports time division multiplexing mapping of transmission configuration indicator (TCI) states to a control channel in accordance with aspects of the present disclosure.

As demand for communication resources increases due to an increasing number of wireless devices communicating over the available spectrum, techniques to efficiently and reliably increase throughput are desirable. In some cases, the overall reliability of a wireless communications system may depend on the reliability of a number of different communication channels. For example, a wireless device such as a user equipment (UE) may receive downlink data transmissions from a base station over a downlink data channel (e.g., a physical downlink shared channel (PDSCH)) and downlink control transmissions over a downlink control channel (e.g., a physical downlink control channel (PDCCH)). In such examples, overall system reliability may depend on the reliability of both channels. In some cases, the reliability of the channels may be associated with a diversity of the channels such that increasing the diversity of a channel may increase the reliability of the channel. In some cases, the diversity of a channel may be associated with a number of transmission configuration indicator (TCI) states associated with the channel. For instance, a downlink data channel may be configured for multi-TCI state operation such that different resources (e.g., spatial layers, resource blocks (RBs), orthogonal frequency division multiplexing (OFDM) symbols, OFDM slots, etc.) associated with the downlink data channel may be associated with different TCI states. In some cases, downlink control information (DCI) may include a TCI field indicating the number of TCI states associated with the PDCCH. Accordingly, the PDCCH may feature enhanced diversity and reliability.

In some deployments, however, a downlink control channel (and resources associated with the downlink control channel) may be limited to a single TCI state with no mechanism for assigning the downlink control channel with multiple TCI states. As such, the downlink control channel may be associated with lower transmission diversity and may be less reliable than the PDCCH, thus limiting the achievable efficiency and reliability of the overall wireless communications system.

Various implementations of the present disclosure relate generally to associating (e.g., defining or assigning) multiple TCI states to a downlink control channel based on a time division multiplexing (TDM) mapping. In a first example, a TDM mapping may assign different sets of OFDM symbols to different TCI states. For example, a TDM mapping may assign a first set of OFDM symbols of a CORESET to a first TCI state, and may assign a second set of OFDM symbols to a second OFDM state. Such configuration may be indicated by radio resource control (RRC) signaling or using a bitmap that indicates the different TCI states assigned to different OFDM symbols of the CORESET.

A network may define a CORESET using a number of resource elements (REs) and resource element groups (REGs), which may include the OFDM symbols of the CORESET. A TDM mapping may then be applied over a number of REG bundles of the CORESET. In some cases, however, a REG bundle may include REGs associated with different TCI states such that a UE may not assume common precoding across the REG bundle. In addition, with some TDM mappings, the REG bundles may not be distributed across time and/or frequency.

To increase diversity and time/frequency resource distribution among REG bundles of a CORESET configuration, a sub-REG bundle may be defined as part of a REG bundle. A sub-REG bundle may correspond to the number of REGs within a REG bundle that have the same TCI state. A UE may assume that the same precoding is used within a sub-REG bundle, and that both a first TCI state and a second TCI state (e.g., TCI states 1 and 2) are included in the REG bundle. A UE may implement REG indexing and may determine sub-REG bundles based in part on the TCI state of the symbols.

In some other cases, the network may be configured to support CORESET configurations containing more than three symbols (e.g., four symbols, etc.). For example, a CORESET may be defined in parts such that a consecutive number of OFDM symbols in a first part of the CORESET may associated with a first TCI state, and a different consecutive number of OFDM symbols of the CORESET may be associated with a second TCI state. Mapping then may be performed independently over each part of the CORESET.

Particular implementations of the subject matter described in this disclosure can be implemented to realize one or more of the following potential advantages. In some implementations, the described techniques can be used to improve the diversity and reliability of a downlink control channel. For example, configuring (e.g., defining or assigning) multiple TCI states for a CORESET associated with a downlink control channel may provide a UE with additional quasi-colocation information, such as additional knowledge of quasi-co-located (QCL) reference signals. This may enable the UE to improve channel estimation for the downlink control channel and enhance the ability of the UE to accurately manage different reception beams used for receiving the downlink control channel. As such, the UE may be more likely to successfully receive and decode the downlink control channel, which may increase the reliability of the downlink control channel and improve overall system efficiency. Furthermore, by increasing the reliability of the downlink control channel, the UE may perform fewer reception attempts of the downlink control channel. By reducing the number of reception attempts, the UE may additionally experience increased power savings associated with fewer monitoring occasions and decoding operations.

Aspects of the disclosure are initially described in the context of wireless communications systems. Additional aspects of the disclosure may be described in the context of signaling between devices in wireless communications systems, such as signaling between a base station and a UE. Aspects of the disclosure are further illustrated by and described with reference to apparatus diagrams, system diagrams, and flowcharts that relate to time division multiplexing mapping of TCI states to a control channel, for example, with reference to a number of CORESET configurations.

FIG. 1 illustrates an example of a wireless communications system 100 that supports time division multiplexing mapping of TCI states to a control channel in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems may use control channel signaling to transmit control information to devices in an allocated bandwidth of the system. A base station 105 may transmit information in a control channel such as a PDCCH using one or more control resource sets (CORESETs)). A CORESET may be associated with a number of different transmission configuration indicator (TCI) states which may specify information related to beam management, antenna port configuration, quasi co-location information for transmissions, etc., and a device such as UE 115 may use information in the TCI state for reception of the PDCCH. To increase diversity and reliability for communications, some wireless systems may support more than one TCI state associated with a PDCCH by assigning more than one TCI state to a CORESET. Different multiplexing techniques such as time division multiplexing (TDM) may be used to map resources of the CORESET to different TCI states, and may indicate to a UE 115 which resources of the CORESET correspond to which TCI state.

In some examples, a TDM mapping may map different sets of OFDM symbols to different TCI states. For example, a TDM mapping may assign a first set of OFDM symbols of a CORESET to a first TCI state, and may assign a second set of OFDM symbols to a second OFDM state. To increase diversity and time/frequency resource distribution among REG bundles of a CORESET configuration, a sub-REG bundle may be defined as part of a REG bundle as the number of REGs within the REG bundle that have the same TCI state. Accordingly, UE 115 may assume that the same precoding is used within a sub-REG bundle, and that both a first TCI state and a second TCI state (e.g., TCI states 1 and 2) are included in the REG bundle.

In some other cases, the network may be configured to support CORESET configurations containing CORESETs with more than three symbols (e.g., 4 symbols, etc.) by defining the CORESET in parts, where a consecutive number of OFDM symbols in a first part of the CORESET may associated with a first TCI state, and a different consecutive number of OFDM symbols of the CORESET may be associated with a second TCI state.

Figure 2:
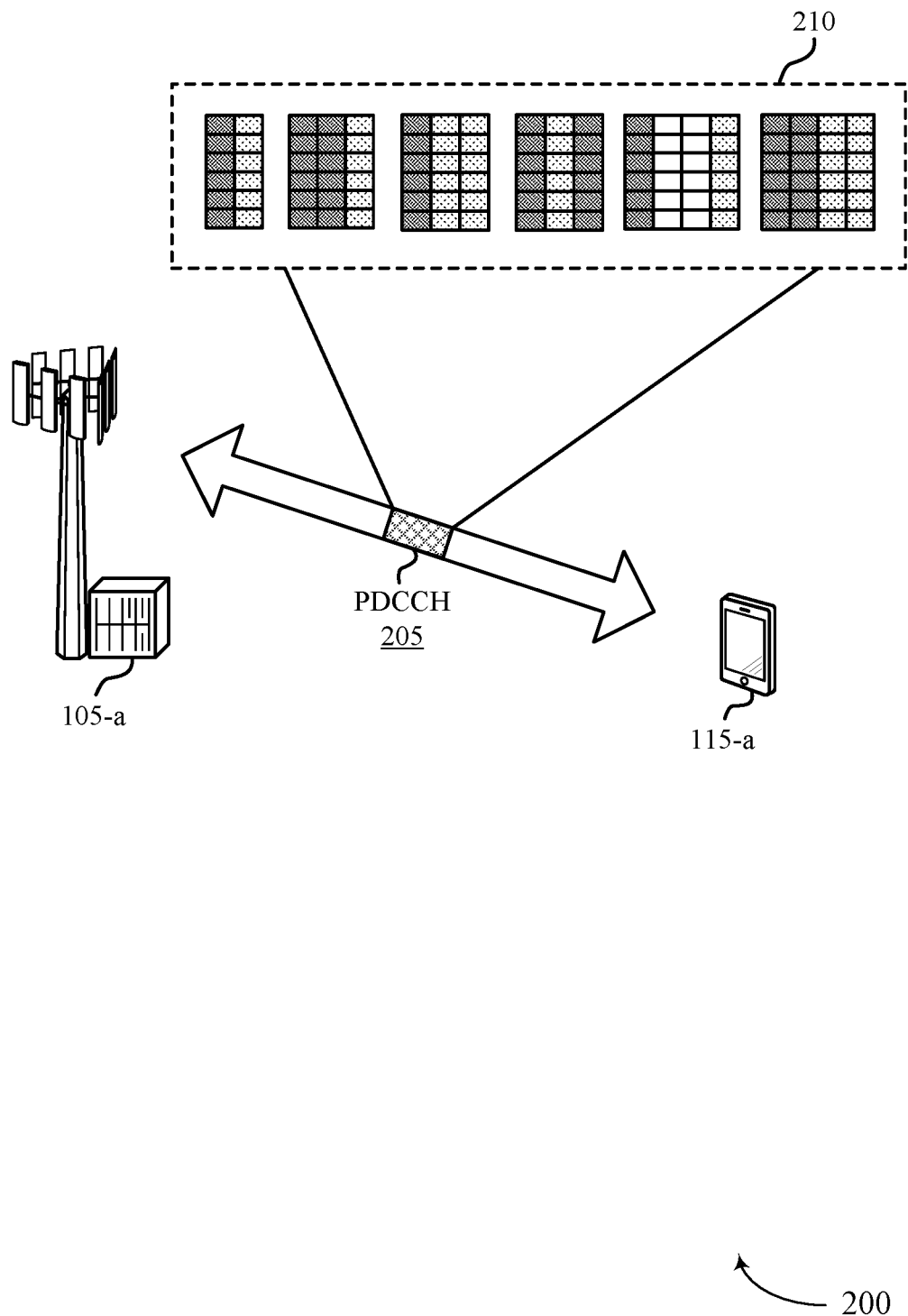
FIG. 2 illustrates an example of a wireless communications system that supports time division multiplexing mapping of TCI states to a control channel in accordance with aspects of the present disclosure.

FIG. 2 illustrates an example of wireless communications system 200 that supports time division multiplexing mapping of TCI states to a control channel in accordance with aspects of the present disclosure. In some examples, wireless communications system 200 may implement aspects of wireless communications system 100 such as base station 105-a and UE 115-a, which may be examples of base stations 105 and UEs 115 described with reference to FIG. 1.

Some wireless communications systems may use control channel signaling to transmit control information to devices over a configured carrier bandwidth of the system. A base station 105-a may transmit information in downlink control channels (e.g., PDCCHs 205), which may be transmitted in one or more CORESETs 210, occupying a portion of the carrier bandwidth. There may be multiple CORESETs 210 on a carrier, such that a UE 115-a may be configured with a number (e.g., up to three) CORESETs in a given bandwidth part. A CORESET 210 may be configured by various different properties. For example, a CORESET 210 may be associated with a number of different TCI states for beam management, antenna port information, etc., and the TCI states may be used for reception of the PDCCH 205. In some cases, the UE 115-a may be notified (e.g., by TCI-Presentin-DCI) of whether a scheduling DCI in the CORESET 210 includes a TCI field for indicating the various TCI states for PDSCH that is scheduled by the DCI. To increase diversity and reliability for communications, some wireless systems may support more than one TCI state associated with a PDCCH 205 (e.g., multi-TCI state PDCCH). In addition, various different multi-TCI state schemes may be implemented according a number of different techniques (e.g., time division multiplexing (TDM), frequency division multiplexing (FDM), and spatial domain multiplexing (SDM)).

In some cases, a CORESET (e.g., such as one of CORESETs 210) may be associated with a number resource blocks in the frequency domain, which may be associated with a number of OFDM symbols (e.g., 1, 2, 3, etc.). Additionally, a CORESET 210 may be associated with a mapping from resource elements (e.g., resource element groups (REGs)) to control channel elements (CCEs). In some cases, a wireless system may enable more than one TCI state (e.g., two TCI states) for the PDCCH 205 by defining and/or assigning multiple TCI states for a CORESET 210. Various multiplexing techniques (e.g., TDM, FDM, SDM, etc.) may be used in some cases where one CORESET 210 has more than one TCI state.

In some cases, one or more CCEs from one or more CORESETs may be aggregated to form resources such as downlink resources used by PDCCH 205. In one example, the base station 105-a may transmit the PDCCH 205 using an aggregation level (e.g., a number of contiguous CCEs), where each CCE contains a number of REGs (e.g., 6 REGs, each corresponding to a resource block in an OFDM symbol).

CCE-to-REG mapping may be performed across a set of REGs or across a REG bundle, where the precoding may be constant across the set of REGs in the REG bundle (e.g., precoder granularity may be sameAsREG-bundle, allContiguousRBs, etc.). In the case of allContiguousRBs, for example for wide band estimation, UE 115-a may not be configured for a set of resource blocks of a CORESET 210 that includes more than a number of subsets (e.g., four subsets) of resource blocks that are not contiguous in frequency. Each REG bundle may contain a number (e.g., L) of REGs, where L is the bundle size. The CCE-to-REG mapping for the REG bundles may be interleaved or non-interleaved (e.g., based on frequency-diverse or frequency-selective transmissions). For non-interleaved CCE-to-REG mapping, L may be some value (e.g., L=6) and each CCE (j) may be mapped to REG bundle (j). For interleaved CCE-to-REG mapping, L may be configured for various different cases. For example, in a first case where the number of symbols of the CORESET is 1 or 2, L may be 2 or 6, and in a second case where the number of symbols of the CORESET is 3, L may be 3 or 6. Then, CCE (j) may be mapped to a REG bundle as follows:

$\{f(6j/L), f(6j/L+1) \ldots f(6j/L+6/L-1)\}$ where $f(.)$ is an interleaver, $f(x)$ is given by:

$f(x) = (rC + c + n_{shift}) \mod(N_{REG}^{CORESET}/L)$ $x = cR + r$ $r = 0, 1, \ldots, R-1$ $c = 0, 1, \ldots, C-1$ $C = N_{REG}^{CORESET}/(LR)$ In some cases, the PDCCH 205 may include a number of coded and rate matched bits that have been scrambled according to a scrambling ID, modulated, and mapped to resource elements for the PDCCH. In addition, a CORESET may be configured to include an index value (e.g., CORESETPoolIndex, which may have a value of 0 or 1) and may be configured to be the same as a given transmission-reception-point identifier (TRP ID).

To decode a candidate control channel (e.g., PDCCH), a UE 115-a may use one or more search spaces for a given bandwidth. For example, the UE 115-a may be configured with up to a threshold number of search space sets in a given bandwidth part (e.g., 10 search space sets). A given search space set may be defined by a number of parameters, such as which CORESET the search space set is associated with, the periodicity or offset in slot units (e.g., monitoringSlotPeriodicityAndOffset), how many slots the search space set occupies within a period (e.g., duration), the PDCCH monitoring pattern within a slot (e.g., monitoringSymbolsWithinSlot), the type of search space set (e.g., a UE-specific search space or a common search space), DCI formats to monitor for the search space set, etc. In addition, the search space set may include a number of PDCCH candidates for each aggregation level, a number of CCEs of a candidate, etc.

By implementing the techniques described herein, diversity and reliability of the downlink control channel may be increased. By identifying multiple TCI states for a CORESET, UE 115-a may identify antenna port information (e.g., quasi-co-location information) that the UE 115-a may use to more efficiently identify and receive downlink transmissions from the base station 105-a. In addition, configuring a CORESET with more than one TCI state may increase robustness of the PDCCH.

Figure 3:
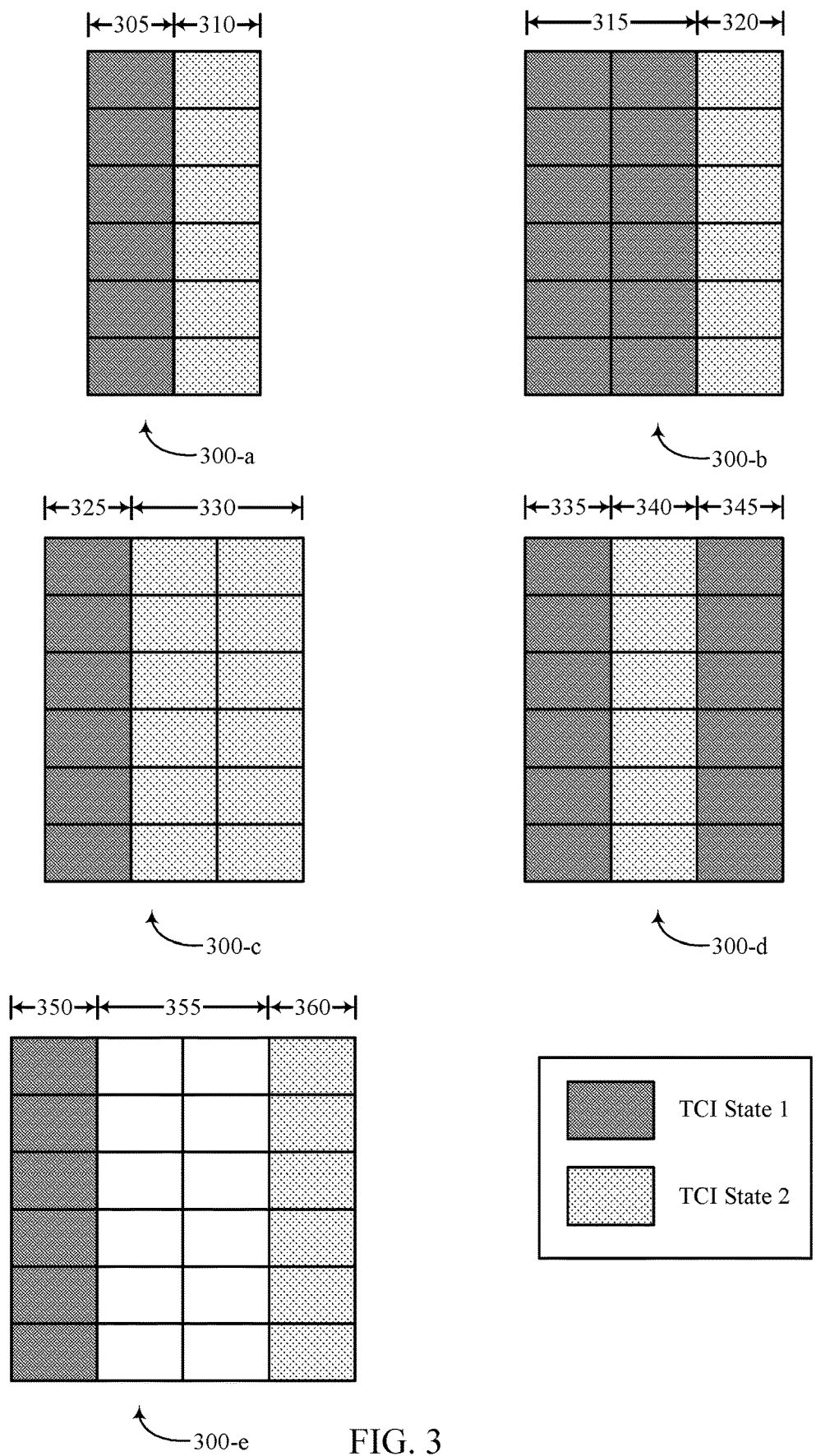
FIG. 3 illustrates an example of control resource set (CORESET) configurations that support time division multiplexing mapping of TCI states to a control channel in accordance with aspects of the present disclosure.

FIG. 3 illustrates an example of CORESET configurations 300-a through 300-e that support time division multiplexing mapping of TCI states to a control channel in accordance with aspects of the present disclosure. In some examples, CORESET configurations 300-a through 300-e may implement aspects of wireless communications system 100. For example, CORESET configurations 300-a through 300-e may be associated with control channel transmissions between devices in wireless communications system 100, such as control channel transmissions between a UE and a base station.

Some wireless communications networks may implement a number of different techniques to increase frequency diversity and scheduling flexibility associated with assigning a number of TCI states (e.g., 2 or more TCI states) to a given CORESET configuration. In one example, a wireless network may use methods involving time division multiplexing for various symbol configurations of a CORESET. For example, in a CORESET configuration of at least two symbols, some symbols of the CORESET may be associated with a first TCI state (e.g., TCI state 1) and some of the symbols of the CORESET may be associated with a second TCI state (e.g., TCI state 2). In another example, a CORESET configuration that includes one symbol may be associated with the first TCI state or the second TCI state. In some cases, a number of different techniques may be used to configure different symbols of the CORESET with different TCI states.

In some examples, such as in CORESET configurations 300-a and 300-b, a fixed rule approach may be used. In a first example of CORESET configuration 300-a, the first half of the symbols 305 may be associated with a first TCI state (e.g., TCI state 1), and the other half of the symbols 310 may be associated with a second TCI state (e.g., TCI state 2). In such examples of two symbol CORESET (e.g., CORESET configuration 300-a) one symbol or set of symbols 305 may be associated with TCI state 1, and the other symbol or set of symbols 310 may be associated with TCI state 2 (e.g., 1+1).

In a second example of CORESET configuration 300-b (e.g., three symbol CORESET), two symbols 315 of the three symbol CORESET may be associated with a first TCI state (e.g., TCI state 1), and the third symbol 320 may be associated with a second TCI state (e.g., TCI state 2). In such examples of three symbol CORESET (e.g., CORESET configuration 300-b) two symbols or a set of two symbols 315 may be associated with TCI state 1, and the other symbol or set of symbols 320 may be associated with TCI state 2 (e.g., 2+1).

In some examples, a bitmap may be included in radio resource control (RRC) signaling to indicate TCI state information. For example, the bitmap may have a length equal to the duration of the CORESET (e.g., 2 symbols, 3 symbols), and the bitmap may be configured as part of the CORESET. In some aspects, the bitmap may indicate which symbol or set of symbols of the CORESET is associated with which TCI state. In one example, such as in the CORESET configuration 300-c, a bitmap may indicate a first symbol or set of symbols 325 as associated with a first TCI state (e.g., TCI state 1) and a second set of symbols 330 as associated with a second TCI state (e.g., TCI state 2). For the three symbol CORESET configuration 300-c, this may include a first symbol associated with TCI state 1 and two symbols associated with TCI state 2 (e.g., 1+2). In another example, such as in CORESET configuration 300-d, the bitmap may indicate that the first symbol 335 and third symbol 345 as being associated with TCI state 1, and the second symbol 340 associated with TCI state 2.

In some other cases, a CORESET configuration 300-d may include non-contiguous (e.g., non-consecutive) symbols. Including non-contiguous symbols as part of a CORESET may support additional beam switching time in cases where the different TCI states are on different beams. For example, in cases where a UE may use a gap or a certain amount of time for beam switching from one TCI state to another (e.g., especially for large subcarrier spacing (SCS) and smaller symbol and cyclic prefix (CP) duration), and when the beam switch time is not absorbed in the cyclic prefix due to smaller CP duration. In addition, a configured time period for beam switching may be used in cases associated with higher frequencies and larger SCS, where the CP duration gets smaller, and the time for switching beams becomes larger than the CP duration (so the beam switching time may not be absorbed into the CP duration). To support such beam switching periods in cases where the CORESET has multiple TCI states (e.g., multiple beam configurations) the CORESET may include the non-contiguous symbols to account for beam switching times.

A CORESET configuration 300-e may include a number of symbols 350 associated with the first TCI state (e.g., TCI state 1), a number of symbols 335 designated as a gap or beam switching time period, and a number of symbols 360 associated with the second TCI state (e.g., TCI state 2). In some cases, the number of symbols of the CORESET configuration may be increased to include the number of gap symbols. In some cases, the CORESET information may be signaled to the UE using control signaling (e.g., an RRC message).

Figure 4:
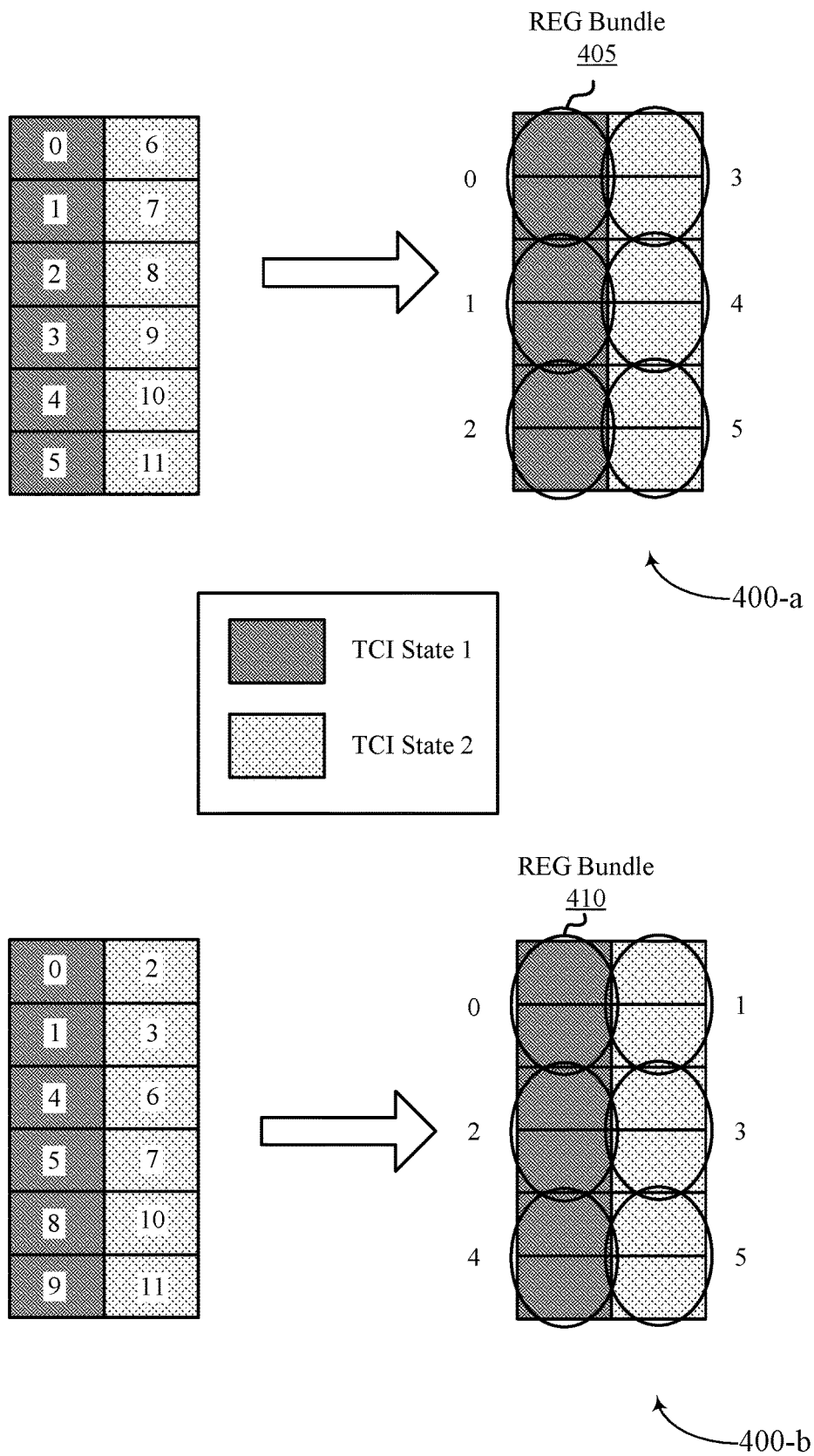
FIG. 4 illustrates an example of additional CORESET configurations that support time division multiplexing mapping of TCI states to a control channel in accordance with aspects of the present disclosure.

FIG. 4 illustrates an example of additional CORESET configurations 400-a and 400-b that support time division multiplexing mapping of TCI states to a control channel in accordance with aspects of the present disclosure. In some examples, CORESET configurations 400-a and 400-b may implement aspects of wireless communications system 100. For example, CORESET configurations 400-a and 400-b may be associated with control channel transmissions between devices in wireless communications system 100, such as control channel transmissions that occur between a UE and a base station.

Some wireless communications networks may use resource elements and resource element groups (REGs) for resource configuration and allocation. In some cases, each REG may be indexed in a time-first manner such that when consecutive REGs are bundled, the REGs may cover all of the symbols of the CORESET (e.g., across one or more RBs depending on a REG bundle size L). A REG bundle may in some cases be a unit for channel estimation when precoderGranularity=sameAsREGbundle, and in such cases, a UE may assume or determine that the same precoding is being used within a REG bundle.

In some cases, however, if different REGs within the REG bundle have different TCI states, the UE may not assume that the same precoding is being used within the REG bundle. For example, the UE may not assume the REGs in a REG bundle to have the same precoding across all REGs of the REG bundle.

In some cases where different REGs within a REG bundle have different TCI states, and to maintain one REG bundle having one TCI state (and having the same precoding across the different REGs within the REG bundle), the REG bundle may be defined in the frequency domain. In such cases, REG indexing may change so that the REG bundle (e.g., L consecutive REGs) have one TCI state.

In a first indexing configuration 400-a, REGs may be indexed in a frequency first, time second manner. For example, the REGs (e.g., 0, 1, 2, . . . , 6, 7, 8 . . . 11) may be indexed in the frequency domain, and REG bundles 405 may be grouped in the same way (e.g., as indexed in the frequency domain). In a second indexing configuration 400-b, the REGs may be indexed in the frequency domain up to L (REG bundle size) REGs, then in the time domain, and repeat the same for determining REG bundles 410.

In some cases, a UE may implement techniques associated with indexing configuration 400-a or 400-b based on signaling (e.g., control signaling) it may receive from the base station. Additionally or alternatively, the UE may autonomously select which kind of REG indexing alternative it may implement. In both indexing configuration 400-a and 400-b, consecutive REG bundles may have different TCI states. In addition, a given aggregation level may be associated with a number of REG bundles such that a first aggregation level may be associated with 3 REG bundles, and the REG bundles may be associated with two different TCI states.

In some cases, however, mapping formula for a control channel element (CCE)-REG (which may contain multiple REGs) may not ensure REG bundles (corresponding to a consecutive number of CCEs) are mapped to both TCI states (depending on mapping type, interleaving depth (R), bundle length (L), etc.). In addition, some mappings may not ensure that the REG bundles are distributed across frequency. For example, CCEs (and PDCCH candidates) may not be distributed in frequency. In addition, according to some indexing alternatives, REG bundles may belong to only one TCI state. (e.g., the bundles may not be distributed across the two TCI states).

Figure 5:
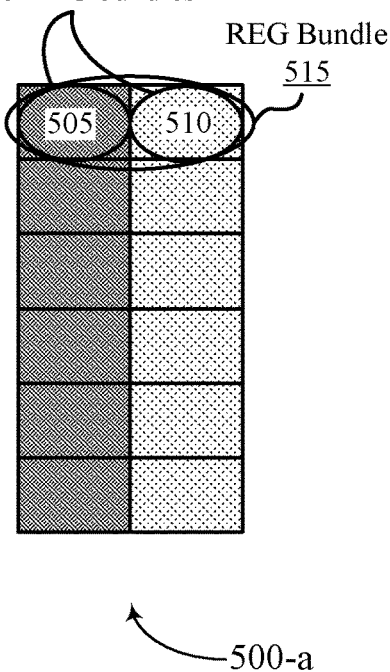
FIG. 5 illustrates an example of additional CORESET configurations that support time division multiplexing mapping of TCI states to a control channel in accordance with aspects of the present disclosure.
Figure 5:
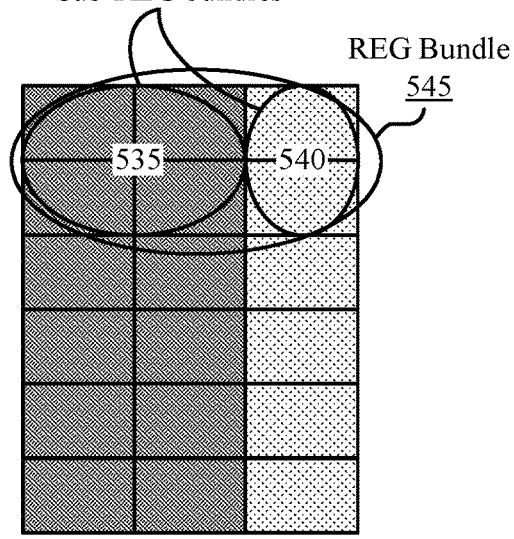
Figure 5:
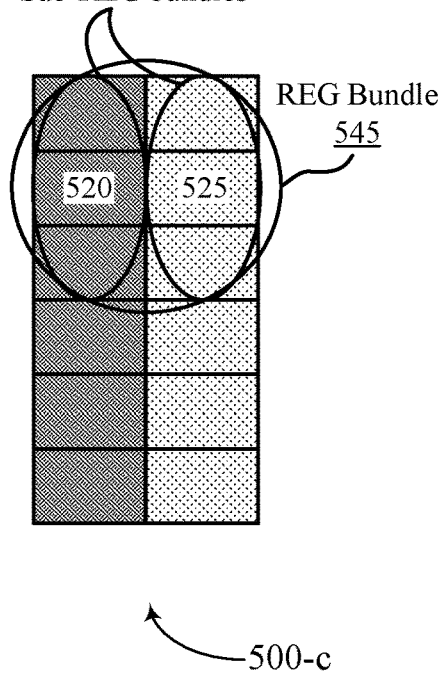
Figure 5:
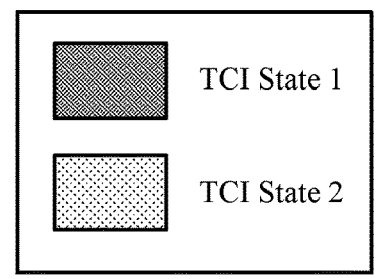

FIG. 5 illustrates an example of CORESET configurations 500-a through 500-c that support time division multiplexing mapping of TCI states to a control channel in accordance with aspects of the present disclosure. In some examples, CORESET configurations 500-a through 500-c may implement aspects of wireless communications system 100. For example, CORESET configurations 500-a through 500-c may be associated with control channel transmissions between devices in wireless communications system 100, such as control channel transmissions between a UE and a base station.

In some cases, a REG bundle may be used for CCE-REG mapping, and REG indexing may be performed first in time. To increase the distribution of REG bundles across frequency, time, TCI state, etc., a sub-REG bundle may be defined. A sub-REG bundle may correspond to the number of REGs within a REG bundle that have the same TCI state. A UE may assume that the same precoding is used within a sub-REG bundle, and that both a first TCI state and a second TCI state (e.g., TCI states 1 and 2) are included in the REG bundle. A UE may implement REG indexing and may determine sub-REG bundles based in part on the TCI state of the symbols. In such cases, when precoderGranularity=sameAsREG-bundle, the unit of channel estimation (with the same precoding) becomes the sub-REG bundle.

A first mapping configuration 500-a may be a two symbol CORESET with L (REG bundle size) equal to two (e.g., L=2). The mapping configuration 500-a may include two sub-REG bundles 505 and 510 as part of the REG bundle 515.

A second mapping configuration 500-b may be a three symbol CORESET with L (REG bundle size) equal to six (e.g., L=6). The mapping configuration 500-b may include two sub-REG bundles 535 and 540 as part of the REG bundle 545.

A first mapping configuration 500-c may be a two symbol CORESET with L (REG bundle size) equal to six (e.g., L=6). The mapping configuration 500-c may include two sub-REG bundles 520 and 525 as part of the REG bundle 545.

Figure 6:
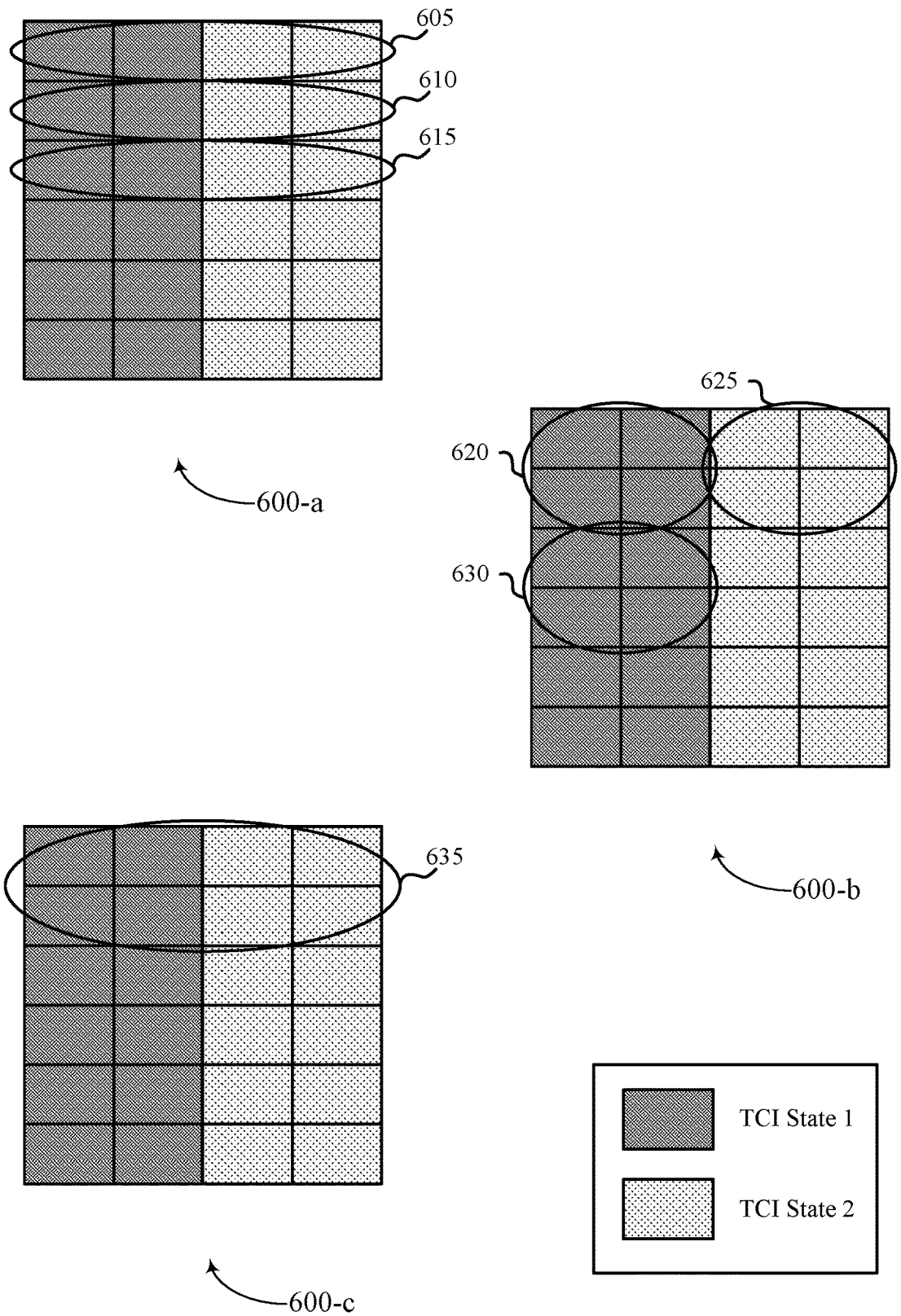
FIG. 6 illustrates an example of additional CORESET configurations that support time division multiplexing mapping of TCI states to a control channel in accordance with aspects of the present disclosure.

FIG. 6 illustrates an example of a CORESET configurations 600-a through 600-c that support time division multiplexing mapping of TCI states to a control channel in accordance with aspects of the present disclosure. In some examples, CORESET 600-a through 600-c may implement aspects of wireless communications system 100. For example, CORESET configurations 600-a through 600-c may be associated with control channel transmissions between devices in wireless communications system 100, such as control channel transmissions between a UE and a base station.

Some wireless communications networks may be configured to support CORESET configurations containing CORESETs with more than three symbols (e.g., 4 symbols, etc.). For some cases, supporting a larger number of symbols may balance the number of symbols associated with a first TCI state and a second TCI state. For example, various REG bundle sizes may be configured (or preconfigured) with a given REG bundle size L (e.g., REG bundle size may be configured to be even numbers such as 2, 4, 6, 8 REGs per REG bundle). In some examples (e.g., REG bundle size 4 and 8), part of the REG bundle may be mapped to one CCE and the remaining part may be mapped to another CCE (e.g., because one CCE contains 6 REGs).

A first CORESET configuration 600-a may be an example of a four symbol CORESET configuration, including, for example, three REG bundles: REG bundle 0 (605), REG bundle 1 (610), and REG bundle 2 (615). In the example of CORESET configuration 600-a, the REG bundle size (L) may be 4, and half of REG bundle 1 (610) may belong to one CCE, and another half may belong to another CCE.

A second CORESET configuration 600-b may be an example of a four symbol CORESET configuration, including, for example, three REG bundles: REG bundle 0 (620), REG bundle 1 (625), and REG bundle 2 (630). In the example of CORESET configuration 600-b, the REG bundle size (L) may be 4, and half of REG bundle 1 (610) may belong to one CCE, and another half may belong to another CCE.

A third CORESET configuration 600-c may be an example of a four symbol CORESET configuration, including, for example, one REG bundles: REG bundle 0 (635). In the example of CORESET configuration 600-c, the REG bundle size (L) may be 8, and six REGs of REG bundle 0 (635) may belong to one CCE, and the remaining two REGs may belong to another CCE.

Figure 7:
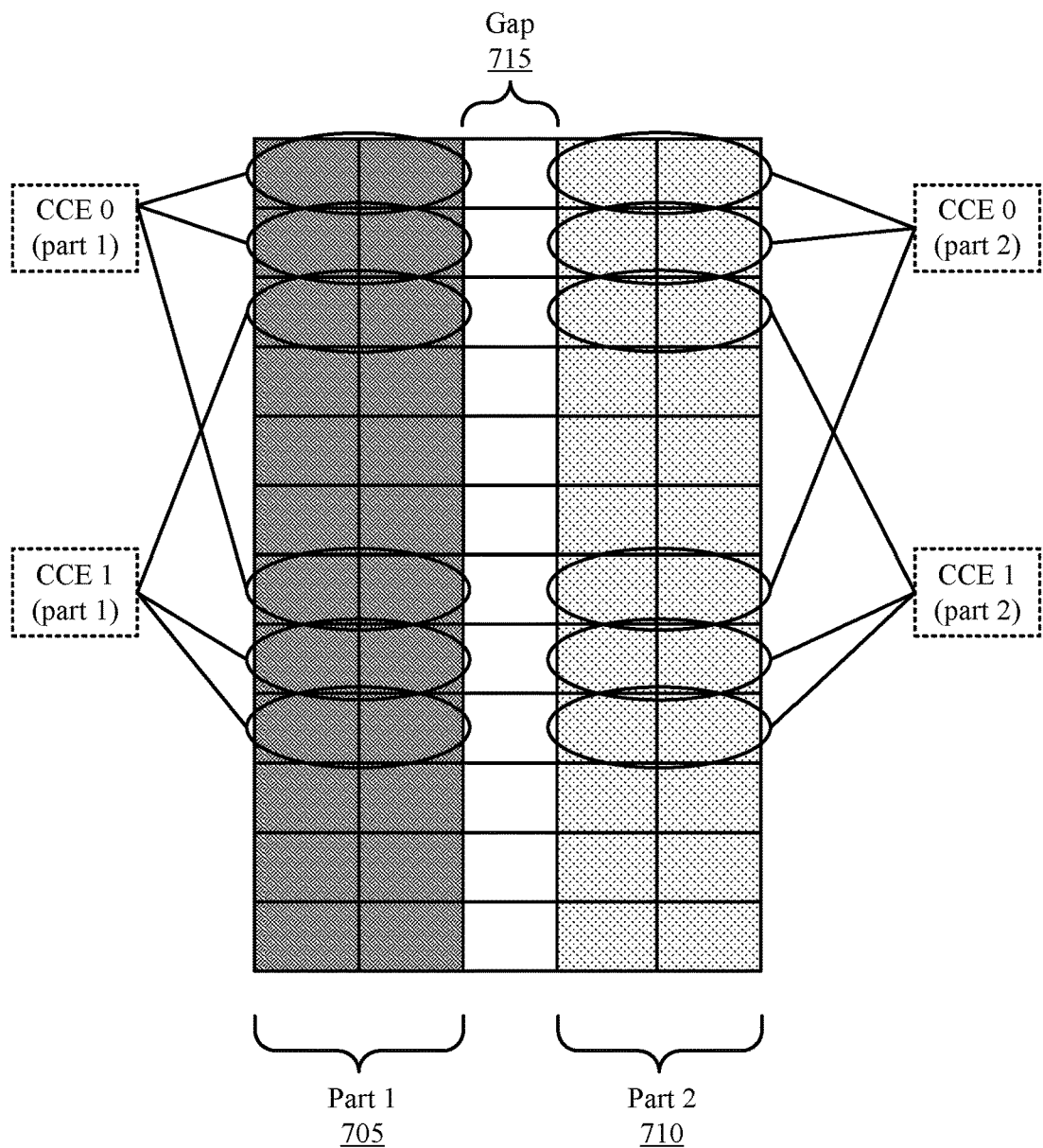
FIG. 7 illustrates an example of an additional CORESET configuration that supports time division multiplexing mapping of TCI states to a control channel in accordance with aspects of the present disclosure.
Figure 7:
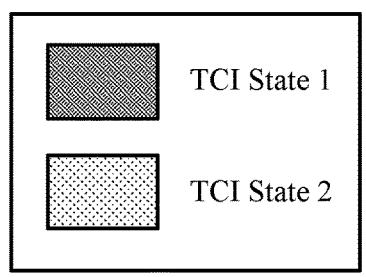

FIG. 7 illustrates an example of a CORESET configuration 700 that supports time division multiplexing mapping of TCI states to a control channel in accordance with aspects of the present disclosure. In some examples, CORESET configuration 700 may implement aspects of wireless communications system 100. For example, CORESET configuration 700 may be associated with control channel transmissions between devices in wireless communications system 100, such as control channel transmissions between a UE and a base station.

In some cases, CCE-REG mapping may be performed across all symbols of the CORESET (e.g., irrespective of TCI state 1 or 2). In such cases, each PDCCH candidate for a given aggregation level may be mapped to one or more REG bundles in the CORESET. In some other cases, however, mapping may be performed across one or more symbols or across parts of the CORESET. Accordingly, in some cases, a CORESET may be defined over two parts.

In some examples, a first part of the CORESET (part 1 (705)) may be defined over a consecutive number of symbols with the TCI state 1, and the second part (part 2 (710)), may be defined over a consecutive number of symbols with TCI state 2. The two parts (the part 1 (705) and part 2 (710)) may have the same length, and in some cases the two parts may be separated by a gap 715. In some examples, the duration (per part and overall) and the gap duration may be configured as part of the CORESET configuration 700.

In addition, CCE-REG mapping may be performed independently across part 1 (705) and part 2 (710). For example, within each part (e.g., part 1 (705), part 2 (710)) REG/REG bundle indexing and CCE REG mapping may be performed using techniques described herein. For example, such indexing and CCE REG mapping may include the same parameters for CCE-REG mapping (type, L, R) for both parts. In some examples, part 2 (710) may be a copy of part 1 (705) with a different TCI state.

A copy of each CCE index (e.g., as determined by a hashing function), may be included in part 1 (705) and one copy may be included in part 2 (710) (because in some cases interleaving is done separately, and the hashing function may be also done separately). In addition, a PDCCH candidate with a given aggregation level (AL) equal to the REG bundle size (e.g., AL=L defined in a search space set associated with CORESET configuration 700 for a PDCCH candidate) may have L CCEs in part 1 (705) and L CCEs in part 2 (710). In some cases, there may be the same CCE indices in part 1 (705) and part 2 (710), and the L CCE indices for the PDCCH candidate may be determined according to the following, where the effective aggregation level for the PDCCH candidate is 2L:

For a search space set s associated with CORESET p, the CCE indexes for aggregation level L corresponding to PDCCH candidate $m_{s,n_{CI}}$ of the search space set $n_{sf}^{\mu}$ for an active DL BWP of a serving cell corresponding to carrier indicator field $n_{CI}$, are given by:

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right\} + i$$

where for any CSS, $Y_{p,n_{s,f}^{\mu}}=0$;
for a USS, $Y_{p,n_{s,f}^{\mu}}=(A_p \cdot Y_{p,n_{s,f}^{\mu}}) \bmod D$, $Y_{p,-1}=n_{RNTI} \neq 0$, $A_p=39827$ for p mod 3=0, $A_p=39829$ for p mod 3=1, $A_p=39839$ for p mod 3=2, and D=65537;
i=0, . . . , L−1;
$N_{CCE,p}$ is the number of CCEs per part (e.g., in part 1 or in part 2), numbered from 0 to $N_{CCE,p}-1$, in CORESET p;

$m_{s,n_{CI}} = 0, \ldots, M_{s,n_{CI}}^{(L)} - 1$, where $M_{s,n_{CI}}^{(L)}$ is the number of PDCCH candidates may be configured to monitor for aggregation level L of a search space set s for a serving cell corresponding to $n_{CI}$;

for any CSS, $M_{s,max}^{(L)} = M_{s,0}^{(L)}$;

for a USS, $M_{s,max}^{(L)}$ is the maximum $M_{s,n_{CI}}^{(L)}$ over all configured $n_{CI}$ values for a CCE aggregation level L of search space s;

the radio network temporary identifier (RNTI) value used for $n_{RNTI}$ is the C-RNTI.

In the example of CORESET configuration 700, part 1 (705) may be configured in the same way or in a similar way to the second part (part 2 (710)). In some aspects, part 1 (705) and part 2 (710) may be copies of one another, except the TCI states for both parts may be different. In such examples, configuration information for the CORESET may indicate which symbols are associated with each TCI state. In the example of CORESET configuration 700, the duration of the CORESET may be 5 symbols, with part 1 (705) and part 2 (710) consisting of 2 symbols each, with a one symbol gap 715 in between. In addition, CORESET configuration 700 may be associated with a REG length of 2 (L=2), R=2, and AL=2 such that the PDCCH candidate consists of CCE0 and CCE1 in part 1 (705) and CCE0 and CCE1 in part 2 (710).

In some examples, rate matching (e.g., mapping coded bits of the DCI to PDCCH resources), may be applied according to a number of different techniques. In a first example, a device may apply separate rate matching, where the number of coded bits for rate matching may be determined based on the number of control channel elements in one part only (e.g., L CCEs in part 1 (705) or in part 2 (710)). The coded bits may be mapped to CCE indices for that PDCCH candidate in part 1 (705), and the same coded bits may be mapped to the same CCE indices for that PDCCH candidate in part 2 (710).

In a second example, a device may apply joint rate matching, where the number of coded bits for rate matching is determined based on the number of CCEs in both parts (e.g., 2L CCEs in parts 1 and 2 (705 and 710)). The first half of the coded bits may be mapped to CCE indices for that PDCCH candidate in part 1 (705), and the second half of the coded bits may be mapped to the same CCE indices for that PDCCH candidate in part 2 (710).

Figure 8:
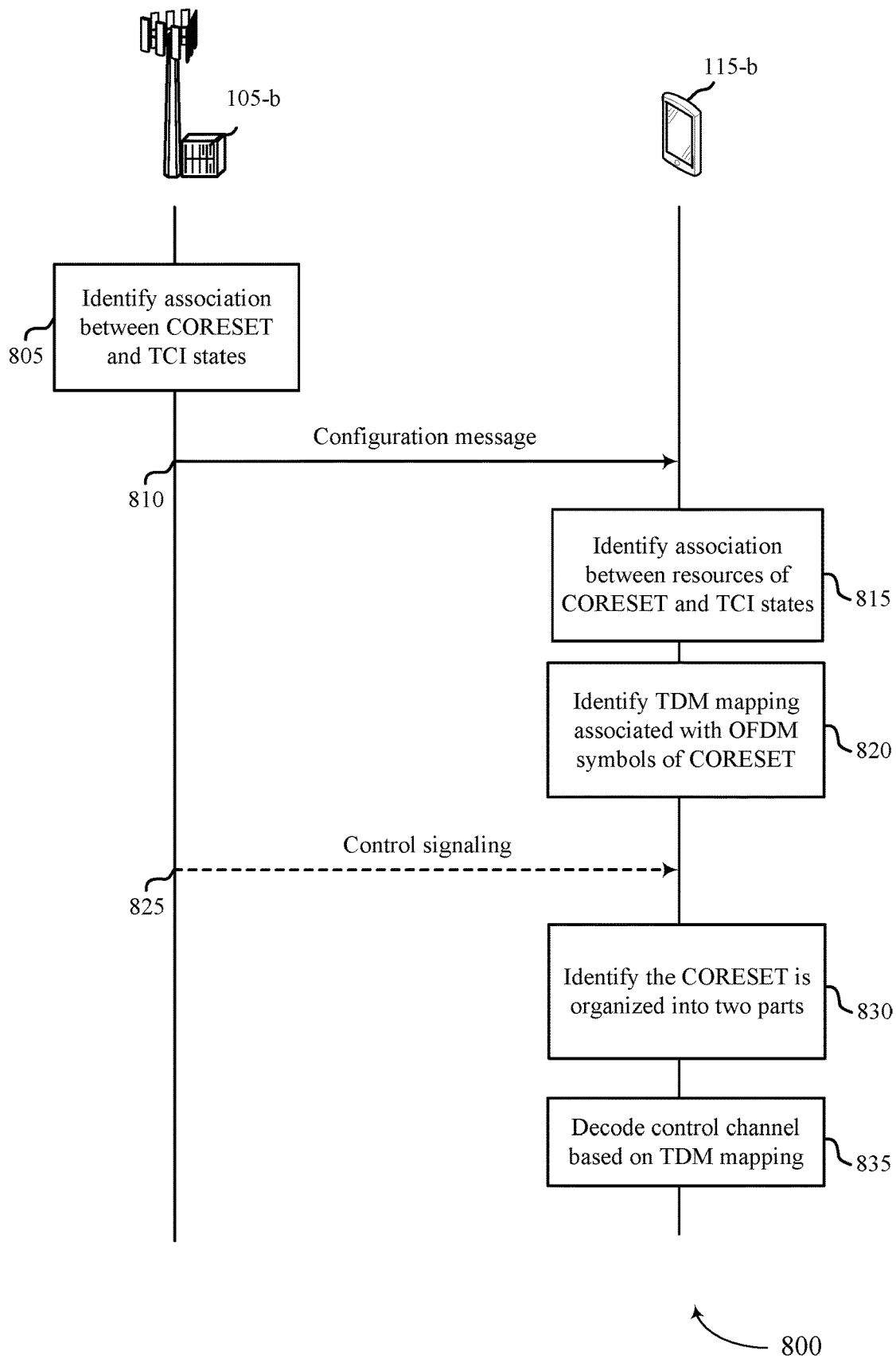
FIG. 8 illustrates an example of a process flow chart that supports time division multiplexing mapping of TCI states to a control channel in accordance with aspects of the present disclosure.

FIG. 8 illustrates an example of a process flow chart 800 that supports time division multiplexing mapping of TCI states to a control channel in accordance with aspects of the present disclosure. In some examples, process flow chart 800 may implement aspects of wireless communications system 100. For example, process flow chart 800 may include signaling between a UE 115-*b* and a base station 105-*b*, which may be examples of UEs 115 and base stations 105 described with reference to FIGS. 1 and 2.

At 805, the base station 105-*b* may identify an association between resources of a CORESET and a number of TCI states based on a TDM mapping. In some cases, the base station 105-*b* may identify that the TDM mapping includes a first association between a first set of OFDM symbols of the CORESET and a first TCI state of the number of TCI states. The base station 105-*b* may further identify that the TDM mapping includes a second association between a second set of OFDM symbols of the CORESET and a second TCI state of the plurality of TCI states.

At 810, base station 105-*b* may transmit, and the UE 115-*b* may receive, a configuration message indicating that a CORESET for a downlink control channel (e.g., PDCCH) is associated with the number of TCI states. In some cases, the configuration message may be an RRC message transmitted from base station 105-*b* on a downlink channel.

At 815, the UE 115-*b* may identify an association between resources of the control resource set and the number of TCI states based at least in part on the TDM mapping. In some cases, the UE 115-*b* may identify the association based on the configuration message transmitted by the base station 105-*b*.

At 820, the UE 115-*b* and/or base station 105-*b* may further identify that the TDM mapping includes a first association between a first set of OFDM symbols of the CORESET and a first TCI state of the number of TCI states. The UE 115-*b* and/or base station 105-*b* may also identify that the TDM mapping includes a second association between a second set of OFDM symbols of the CORESET and a second TCI states.

The UE 115-*b* and base station 105-*b* may identify that the resources of the CORESET include a set of REG bundles that may span the sets of OFDM symbols. Each REG bundle may include one or more sub-REG bundles, where each REG bundle of the sub-REG bundles is associated with the first TCI state or the second TCI state. In some cases, the UE 115-*b* and/or base station 105-*b* may identify one or more REGs in a sub-REG bundle, and may further identify that a precoding is common to the one or more REGs in the sub-REG bundle (e.g., precoding may be the same for REGs in a sub-REG bundle). The UE 115-*b* and/or the base station 105-*b* may perform a channel estimation procedure for a PDCCH candidate in the CORESET based on identifying the common precoding.

At 825, the base station 105-*b* may transmit control signaling to the UE 115-*b*. In some cases, the control signaling may include information about the association between the OFDM symbols of the CORESET and different TCI states. For example, the control signaling may include a bitmap which indicates the first association between the first set of OFDM symbols of the CORESET and the first TCI state, and may also indicate the second association between the second set of OFDM symbols of the CORESET and the second TCI state. In some examples, the bitmap may be equal to the duration of the CORESET.

In some examples, the first set of OFDM symbols of the CORESET configuration may be half of the total number of OFDM symbols of the CORESET, and the second set of OFDM symbols may be a second half of the total number of OFDM symbols of the CORESET. In some other examples, the first set of OFDM symbols may be included in the first portion of the total number of REGs in the CORESET, and the second set of OFDM symbols may be included in the second portion of the total number of REGs.

In yet other examples, the UE 115-*a* and/or base station 105-*a* may index both the first set of REGs and the second set of REGs in a frequency-first, time-second manner.

At 825, the base station 105-*b* may transmit additional control signaling to the UE 115-*b*, which may identify a configuration for the CORESET. In some cases, the configuration may include a number of OFDM symbols that may be associated with the first TCI state, and another number of OFDM symbols that may be associated with the second TCI state. The configuration may also indicate a number of symbols for switching between the first TCI state and the second TCI state (e.g., gap symbols).

At 830, the UE 115-*b* and/or the base station 105-*b* may identify that the CORESET is organized into two parts. In some cases, the association between resources of the CORESET may be between a first set of consecutive OFDM symbols and a first part of the CORESET. In some other cases, the association may be between the second set of consecutive OFDM symbols and the second part of the CORESET. In some examples, the first set of consecutive OFDM symbols and the second set of consecutive OFDM symbols may have the same length.

In some aspects, the UE 115-b may receive control signaling (e.g., such as control signaling at step 825), which may indicate configuration information for the CORESET. The UE 115-b may apply the TDM mapping independently across the first part of the CORESET and the second part of the CORESET based on the configuration information. In some cases, the configuration information may include a symbol duration and a symbol gap configured for the CORESET.

In some cases, the UE 115-b and/or the base station 105-b may identify a control channel element to REG (e.g., CCE-REG) bundle mapping between a number of CCEs, the first set of REG bundles included in the first part of the CORESET, the second set of REG bundles included in the second CORESET, or a combination thereof. In addition, the UE 115-b and/or base station 105-b may identify an interleaving configuration for the CCE-REG bundle mapping for the CORESET, and may apply the CCE-REG bundle mapping independently across the first part of the CORESET and the second part of the CORESET.

In some examples, the UE 115-b and/or the base station 105-b may identify an aggregation level for a PDCCH candidate associated with the first part of the CORESET or the second part of the CORESET, and may identify indices for the CCEs based on the PDCCH candidate configuration. In some cases, the number of CCEs associated with the first part of the CORESET and the second part of the CORESET is based on the aggregation level for the PDCCH candidate. The UE 115-b and/or base station 105-b may identify a first index that is associated with the first part of the CORESET, where the first index corresponds to a second index that is associated with the second part of the CORESET (e.g., the first index may map to a second index in a different part of the CORESET).

In yet other examples, the UE 115-b and/or base station 105-b may identify a number of coded bits for a PDCCH candidate rate matching procedure. The rate matching may be based on the first set of CCEs of the PDCCH candidate included in the first part of the CORESET and a second set of CCEs of the PDCCH candidate included in the second part of the CORESET.

In some cases, the UE 115-b and/or base station 105-b may identify that the number of coded bits is based the number of CCEs in the first set of CCEs only, and may map the coded bits to a first set of CCE indices associated with the PDCCH candidate according to the first part of the CORESET. The UE 115-b and/or base station 105-b may map the coded bits to the second set of CCE indices associated with the PDCCH candidate according to the second part of the CORESET.

In some other cases, the UE 115-b and/or base station 105-b may identify that the number of coded bits is based on the number of CCEs in both the first set of CCEs and the second set of CCEs, and may map the coded bits to a first set of CCE indices associated with the PDCCH candidate according to the first part of the CORESET. The UE 115-b and/or base station 105-b may map the coded bits to the second set of CCE indices associated with the PDCCH candidate according to the second part of the CORESET.

At 835, the UE 115-b may decode the downlink control channel (e.g., the PDCCH) based at least in part on the TDM mapping and including techniques described herein.

Figure 9:
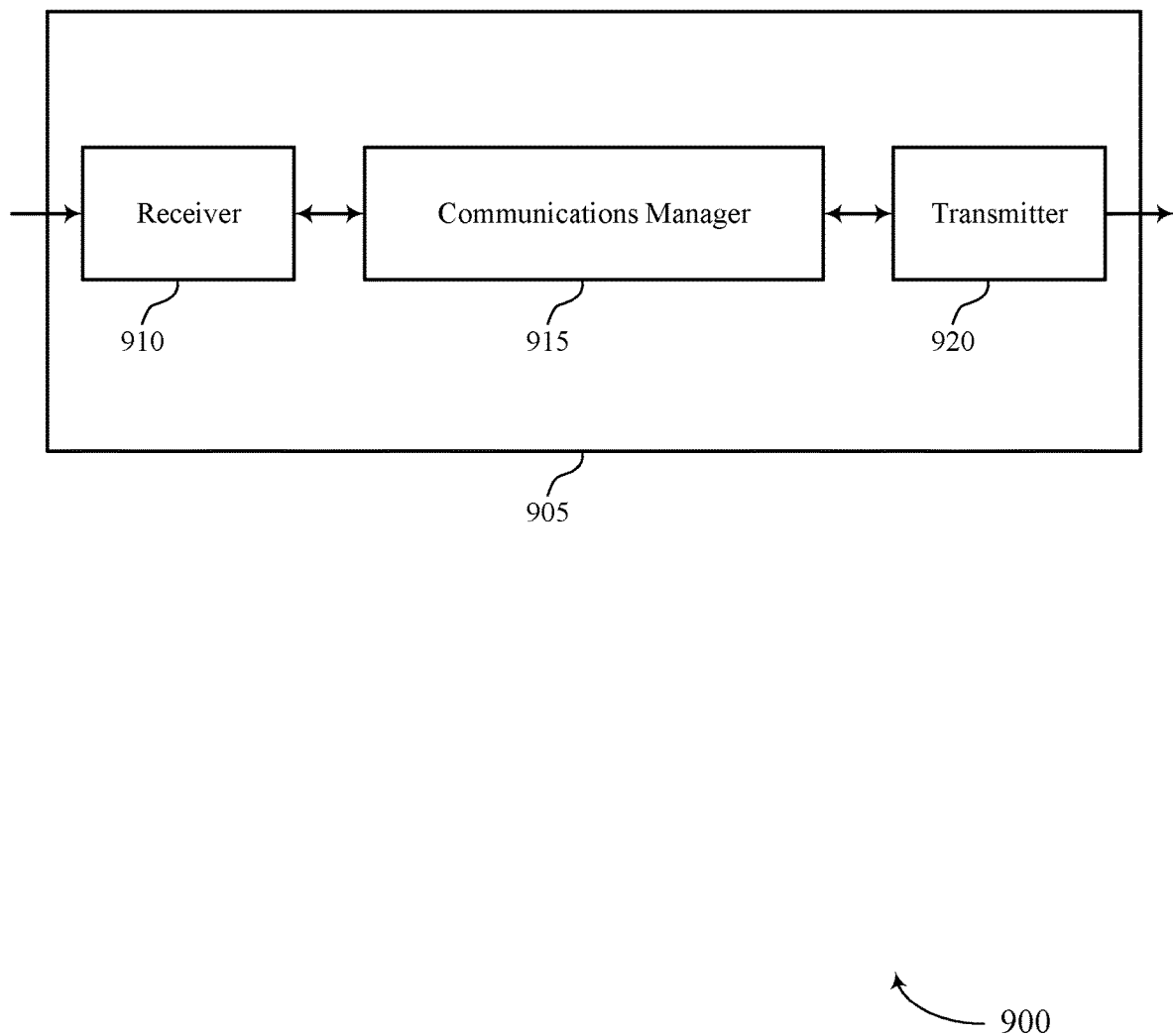
FIGS. 9 and 10 show block diagrams of devices that support time division multiplexing mapping of TCI states to a control channel in accordance with aspects of the present disclosure.

FIG. 9 shows a block diagram 900 of a device 905 that supports time division multiplexing mapping of TCI states to a control channel in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to time division multiplexing mapping of TCI states to a control channel, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive a configuration message indicating that a control resource set for a downlink control channel is associated with a set of TCI states, identify an association between resources of the control resource set and the set of TCI states based on a time division multiplexing mapping, and decode the downlink control channel based on the time division multiplexing mapping. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, communications manager 915 may be implemented as an integrated circuit or chipset for a mobile device modem, and the receiver 910 and transmitter 920 may be implemented as analog components (e.g., amplifiers, filters, antennas, etc.) coupled with the mobile device modem to enable wireless transmission and reception.

The communications manager 915 as described herein may be implemented to realize one or more potential advantages. Various implementations may enable. At least one implementation may enable the communications manager 915 to effectively increase the number of TCI states associated with a CORESET. In such cases, transmission and reception diversity may increase, and a device may have access to additional antenna information for improved reception of signals.

Based on implementing the techniques as described herein, one or more processors of the device 905 (e.g., processor(s) controlling or incorporated with one or more of receiver 910, communications manager 915, and transmitter 920) may reduce communications latency and increase successful reception of signaling (e.g., such as PDCCH).

Figure 10:
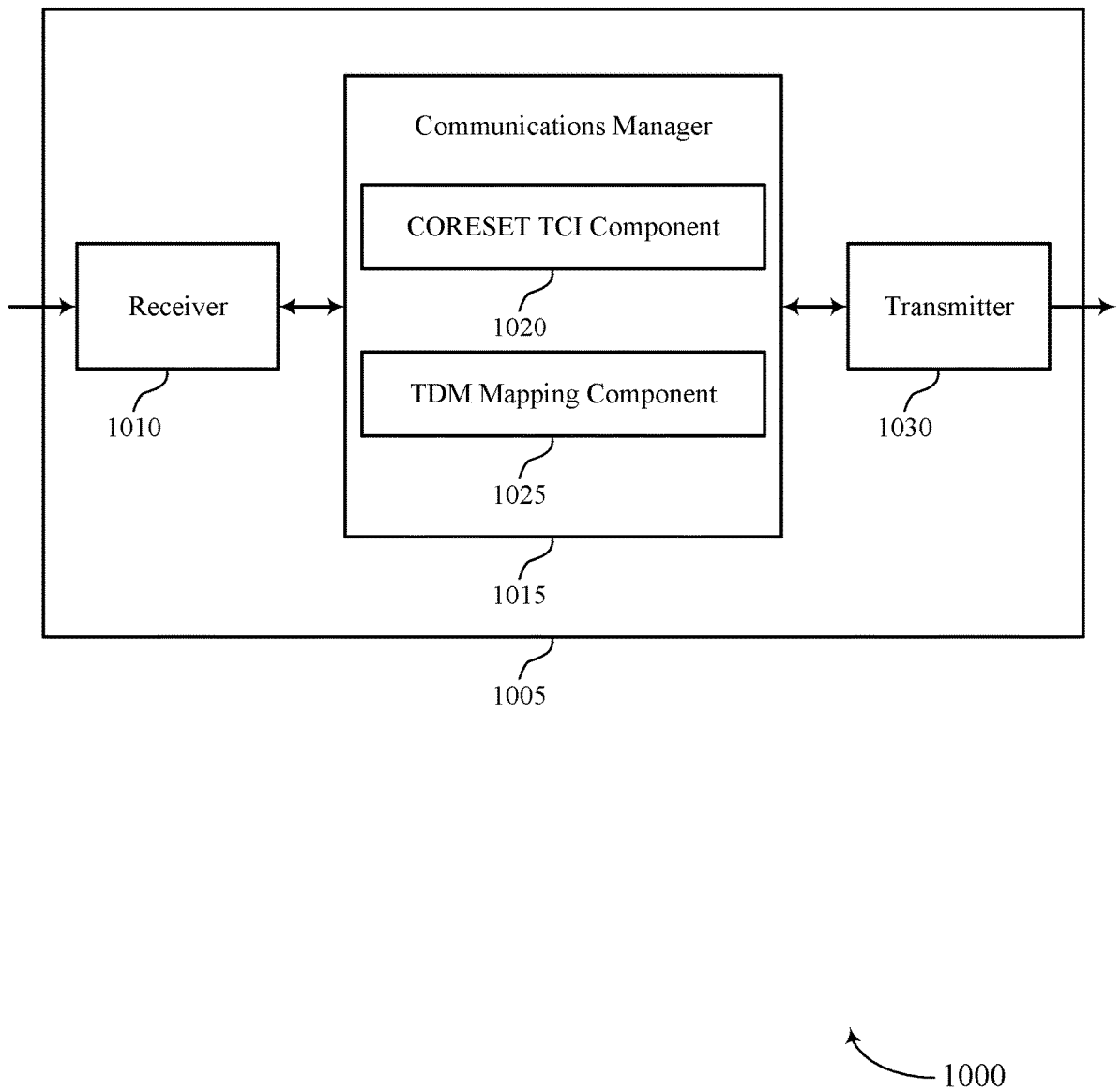

FIG. 10 shows a block diagram 1000 of a device 1005 that supports time division multiplexing mapping of TCI states to a control channel in accordance with aspects of the present disclosure. The device 1005 may be an example of aspects of a device 905, or a UE 115 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to time division multiplexing mapping of TCI states to a control channel, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a CORESET TCI component 1020 and a TDM mapping component 1025. The communications manager 1015 may be an example of aspects of the communications manager 1210 described herein.

The CORESET TCI component 1020 may receive a configuration message indicating that a control resource set for a downlink control channel is associated with a set of TCI states.

The TDM mapping component 1025 may identify an association between resources of the control resource set and the set of TCI states based on a time division multiplexing mapping and decode the downlink control channel based on the time division multiplexing mapping.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
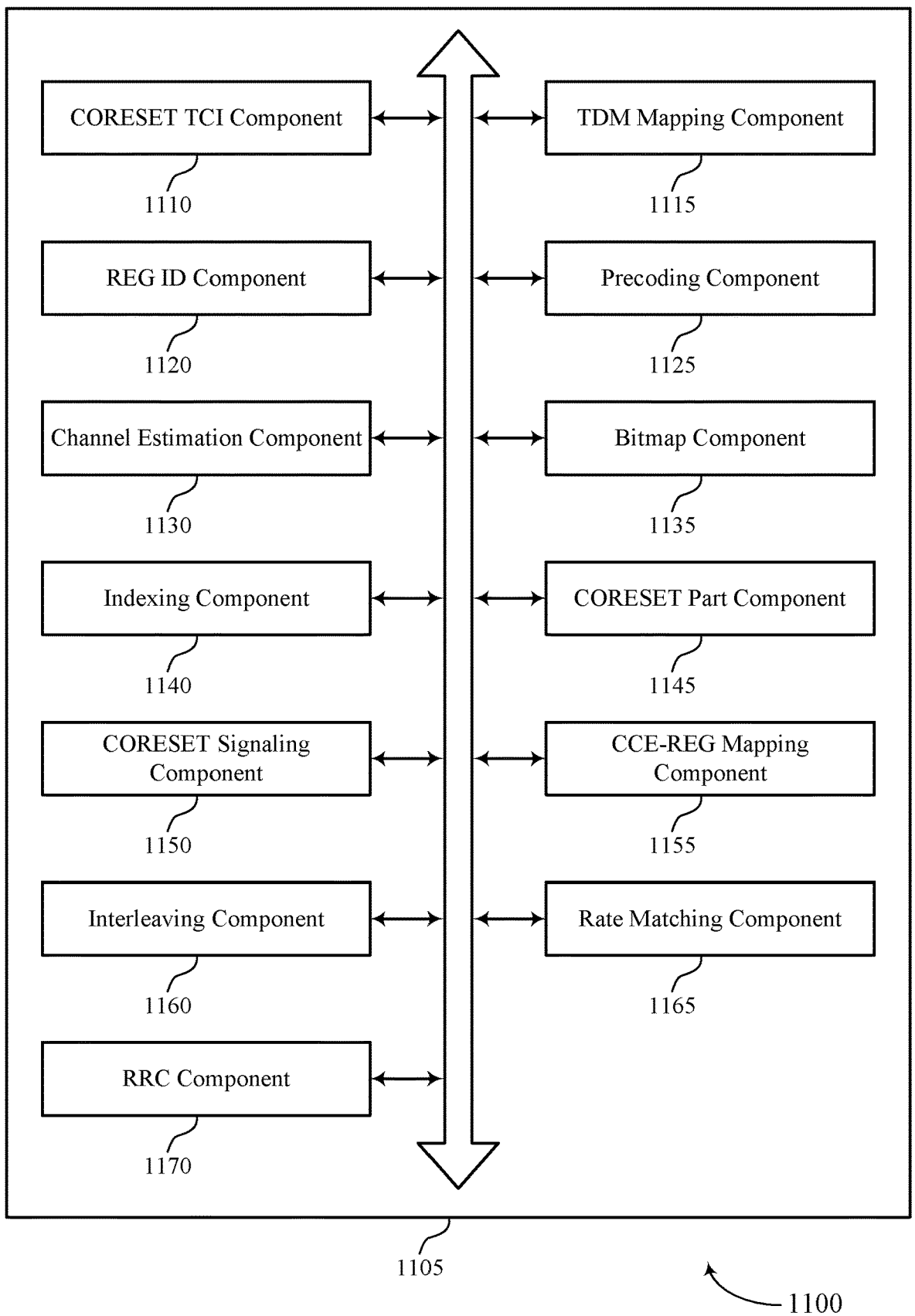
FIG. 11 shows a block diagram of a communications manager that supports time division multiplexing mapping of TCI states to a control channel in accordance with aspects of the present disclosure.

FIG. 11 shows a block diagram 1100 of a communications manager 1105 that supports time division multiplexing mapping of TCI states to a control channel in accordance with aspects of the present disclosure. The communications manager 1105 may be an example of aspects of a communications manager 915, a communications manager 1015, or a communications manager 1210 described herein. The communications manager 1105 may include a CORESET TCI component 1110, a TDM mapping component 1115, a REG ID component 1120, a precoding component 1125, a channel estimation component 1130, a bitmap component 1135, an indexing component 1140, a CORESET part component 1145, a CORESET signaling component 1150, a CCE-REG mapping component 1155, an interleaving component 1160, a rate matching component 1165, and a RRC component 1170. Each of these modules may communicate, directly or indirectly, with one another (e.g., via one or more buses).

The CORESET TCI component 1110 may receive a configuration message indicating that a control resource set for a downlink control channel is associated with a set of TCI states. In some examples, the CORESET TCI component 1110 may receive control information identifying a configuration for the control resource set including a number of the OFDM symbols for the first TCI state, a number of the OFDM symbols for the second TCI state, a number of symbols for switching from the first TCI state to the second TCI state, or a combination thereof.

In some examples, identifying that the time division multiplexing mapping includes a first association between a first set of orthogonal frequency division multiplexing (OFDM) symbols of the control resource set and a first TCI state of the set of TCI states, and a second association between a second set of OFDM symbols of the control resource set and a second TCI state of the set of TCI states.

In some cases, the first set of OFDM symbols include a first half of a total number of OFDM symbols of the control resource set, and the second set of OFDM symbols include a second half of the total number of OFDM symbols of the control resource set.

In some other cases, the first set of OFDM symbols include a first portion of a total number of resource element group bundles of the control resource set, and the second set of OFDM symbols include a second portion of the total number of resource element group bundles of the control resource set.

The TDM mapping component 1115 may identify an association between resources of the control resource set and the set of TCI states based on a time division multiplexing mapping. In some examples, the TDM mapping component 1115 may decode the downlink control channel based on the time division multiplexing mapping.

The REG ID component 1120 may identify that the resources of the control resource set include a set of resource element group bundles spanning the set of OFDM symbols where each resource element group bundle of the set of resource element group bundles includes one or more sub-resource element group bundles, each of the one or more sub-resource element group bundles being associated with one of the first TCI state or the second TCI state. In some examples, the REG ID component 1120 may identify one or more resource element groups including a sub-resource element group bundle of the one or more sub-resource element group bundles.

The precoding component 1125 may identify that a precoding is common to the one or more resource element groups in the sub-resource element group bundle.

The channel estimation component 1130 may perform a channel estimation for a PDCCH candidate in the control resource set based on the identifying.

The bitmap component 1135 may receive control signaling including a bitmap indicating the first association between the first set of OFDM symbols of the control resource set and the first TCI state and the second association between the second set of OFDM symbols of the control resource set and the second TCI state. In some cases, the bitmap has a length equal to a duration of the control resource set.

In some examples, the indexing component 1140 may define the first set of resource element group bundles and the second set of resource element group bundles. The indexing component 1140 may index both the first set of resource element groups and the second set of resource element groups in a frequency-first, time-second manner. In some examples, the indexing component 1140 may index one or more resource element groups from the first set of resource element groups up to a threshold number of resource element groups. In some examples, the indexing component 1140 may index the second set of resource element groups in the frequency domain and in the time domain.

In some examples, the indexing component 1140 may identify a set of indices for the set of control channel elements based on the PDCCH candidate. In some examples, the indexing component 1140 may identify a first index of the set of indices is associated with the first part of the control resource set, where the first index corresponds to a second index of the set of indices that is associated with the second part of the control resource set.

In some cases, each resource element group bundle from the first portion of resource element group bundles and the second portion of resource element group bundles include a number of consecutive resource element groups. In some cases, the threshold number includes a number of resource element groups in each resource element group bundle from the first portion of resource element group bundles or the second portion of resource element group bundles.

The CORESET signaling component 1150 may receive control signaling indicating configuration information for the control resource set.

The CORESET part component 1145 may identify that the control resource set is organized into two parts, where the first association is between a first set of consecutive OFDM symbols and a first part of the control resource set, and where the second association is between a second set of consecutive OFDM symbols and a second part of the control resource set. In some examples, the CORESET part component 1145 may apply the time division multiplexing mapping independently across the first part of the control resource set and the second part of the control resource set based on the configuration information. In some cases, the first set of consecutive OFDM symbols and the second set of consecutive OFDM symbols have the same length. In some cases, the configuration information further includes a symbol duration and a symbol gap configured for the control resource set.

In some examples, the CORESET part component 1145 may identify an aggregation level for a PDCCH candidate associated with the first part of the control resource set or the second part of the control resource set. In some cases, the number of control channel elements associated with the first part of the control resource set and the second part of the control resource set is based on the aggregation level from the PDCCH candidate.

The CCE-REG mapping component 1155 may identify a control channel element-to-resource element group bundle mapping between a set of control channel elements, a first set of resource element group bundles included in the first part of the control resource set, a second set of resource element group bundles included in the second part of the control resource set, or a combination thereof. In some examples, the CCE-REG mapping component 1155 may apply the control channel element-to-resource element group bundle mapping independently across the first part of the control resource set and the second part of the control resource set. The interleaving component 1160 may identify an interleaving configuration for the control channel element-to-resource element group bundle mapping for the control resource set.

The rate matching component 1165 may identify a set of coded bits for a PDCCH candidate rate matching based on a first set of control channel elements of the PDCCH candidate included in the first part and a second set of control channel elements of the PDCCH candidate included in the second part.

In some examples, the rate matching component 1165 may identify the set of coded bits is based on the number of control channel elements in the first set of control channel elements only. In some examples, the rate matching component 1165 may map the set of coded bits to a first set of control channel element indices associated with the PDCCH candidate according to the first part of the control resource set.

In some examples, the rate matching component 1165 may map the set of coded bits to the second set of control channel element indices associated with the PDCCH candidate according to the second part of the control resource set. In some examples, the rate matching component 1165 may identify the set of coded bits is based on the number of control channel elements in both the first set of control channel elements and the second set of control channel elements.

In some examples, the rate matching component 1165 may map a first portion of the set of coded bits to a first set of control channel element indices associated with the PDCCH candidate according to the first part of the control resource set.

In some examples, the rate matching component 1165 may map a second portion of the set of coded bits to the second set of control channel element indices associated with the PDCCH candidate according to the second part of the control resource set.

The RRC component 1170 may receive a configuration from the base station. In some cases, the configuration message includes a radio resource control message.

Figure 12:
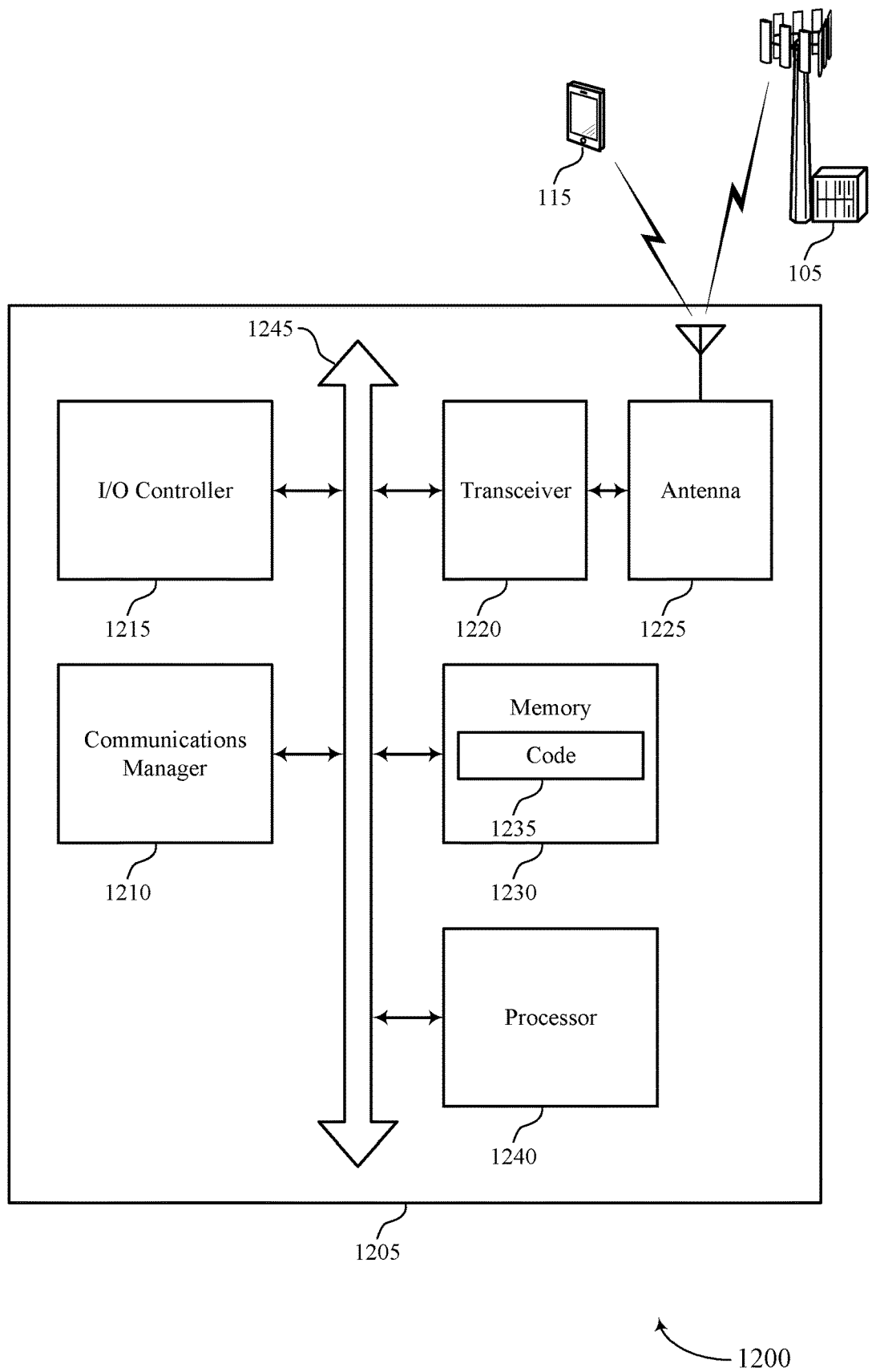
FIG. 12 shows a diagram of a system including a device that supports time division multiplexing mapping of TCI states to a control channel in accordance with aspects of the present disclosure.

FIG. 12 shows a diagram of a system 1200 including a device 1205 that supports time division multiplexing mapping of TCI states to a control channel in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive a configuration message indicating that a control resource set for a downlink control channel is associated with a set of TCI states, identify an association between resources of the control resource set and the set of TCI states based on a time division multiplexing mapping, and decode the downlink control channel based on the time division multiplexing mapping.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting time division multiplexing mapping of TCI states to a control channel).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
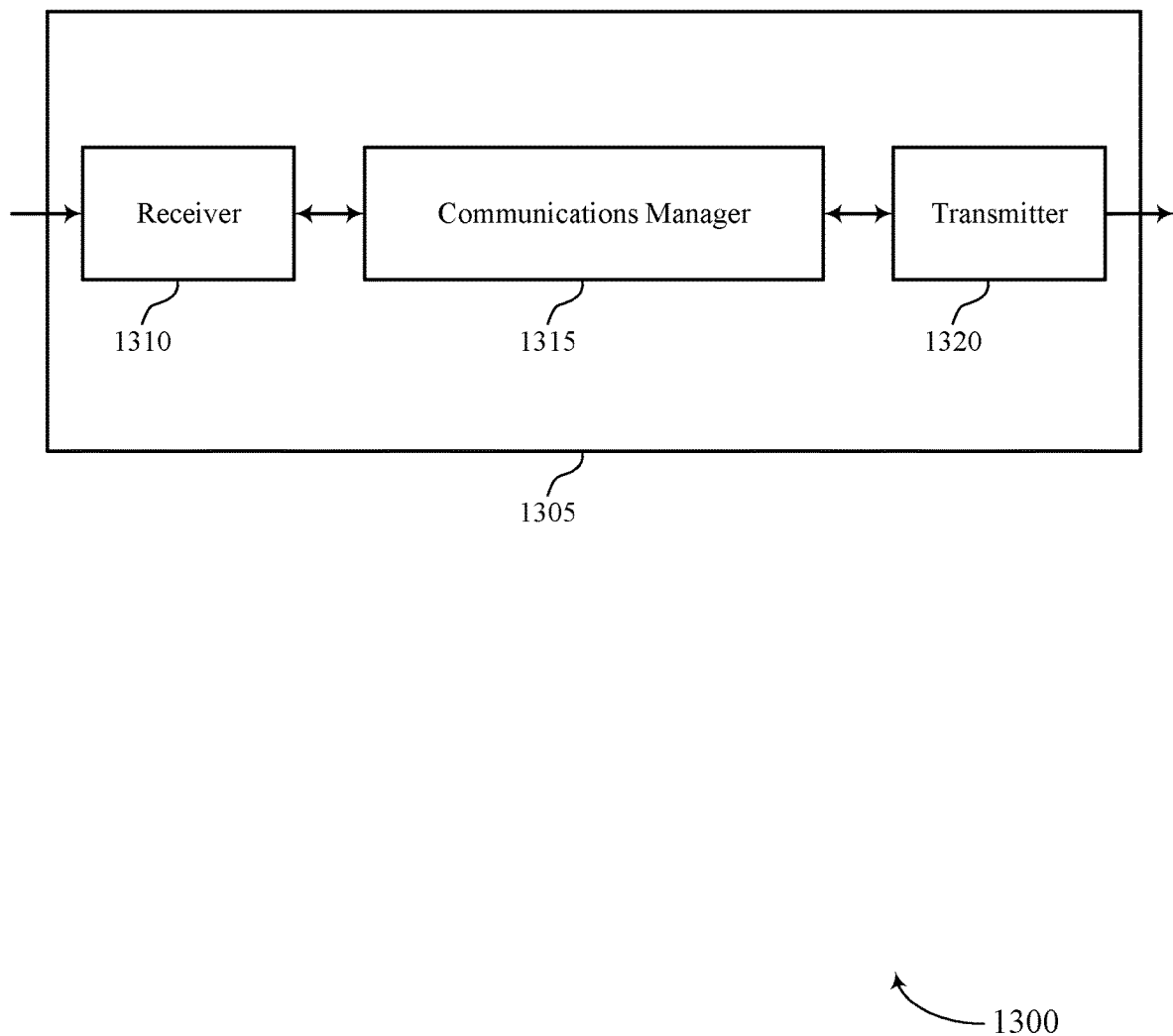
FIGS. 13 and 14 show block diagrams of devices that support time division multiplexing mapping of TCI states to a control channel in accordance with aspects of the present disclosure.

FIG. 13 shows a block diagram 1300 of a device 1305 that supports time division multiplexing mapping of TCI states to a control channel in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to time division multiplexing mapping of TCI states to a control channel, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may identify an association between resources of the control resource set and the set of TCI states based on a time division multiplexing mapping and transmit a configuration message indicating that the control resource set is associated with the set of TCI states. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
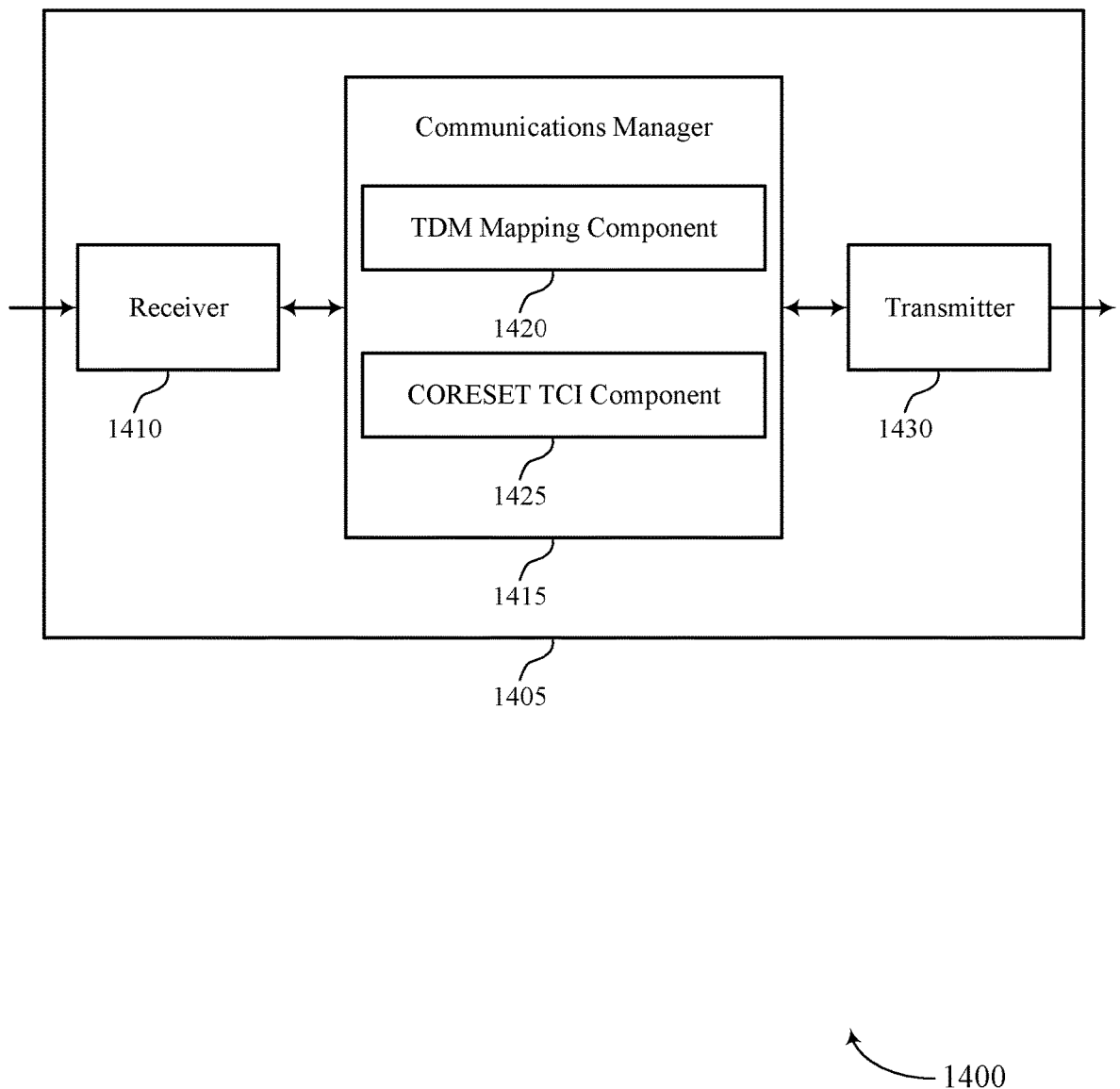

FIG. 14 shows a block diagram 1400 of a device 1405 that supports time division multiplexing mapping of TCI states to a control channel in accordance with aspects of the present disclosure. The device 1405 may be an example of aspects of a device 1305, or a base station 105 as described herein. The device 1405 may include a receiver 1410, a communications manager 1415, and a transmitter 1430. The device 1405 may also include a processor. Each of these components may be in communication with one another (e.g., via one or more buses).

The receiver 1410 may receive information such as packets, user data, or control information associated with various information channels (e.g., control channels, data channels, and information related to time division multiplexing mapping of TCI states to a control channel, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a TDM mapping component 1420 and a CORESET TCI component 1425. The communications manager 1415 may be an example of aspects of the communications manager 1610 described herein.

The TDM mapping component 1420 may identify an association between resources of the control resource set and the set of TCI states based on a time division multiplexing mapping.

The CORESET TCI component 1425 may transmit a configuration message indicating that the control resource set is associated with the set of TCI states.

The transmitter 1430 may transmit signals generated by other components of the device 1405. In some examples, the transmitter 1430 may be collocated with a receiver 1410 in a transceiver module. For example, the transmitter 1430 may be an example of aspects of the transceiver 1620 described with reference to FIG. 16. The transmitter 1430 may utilize a single antenna or a set of antennas.

Figure 15:
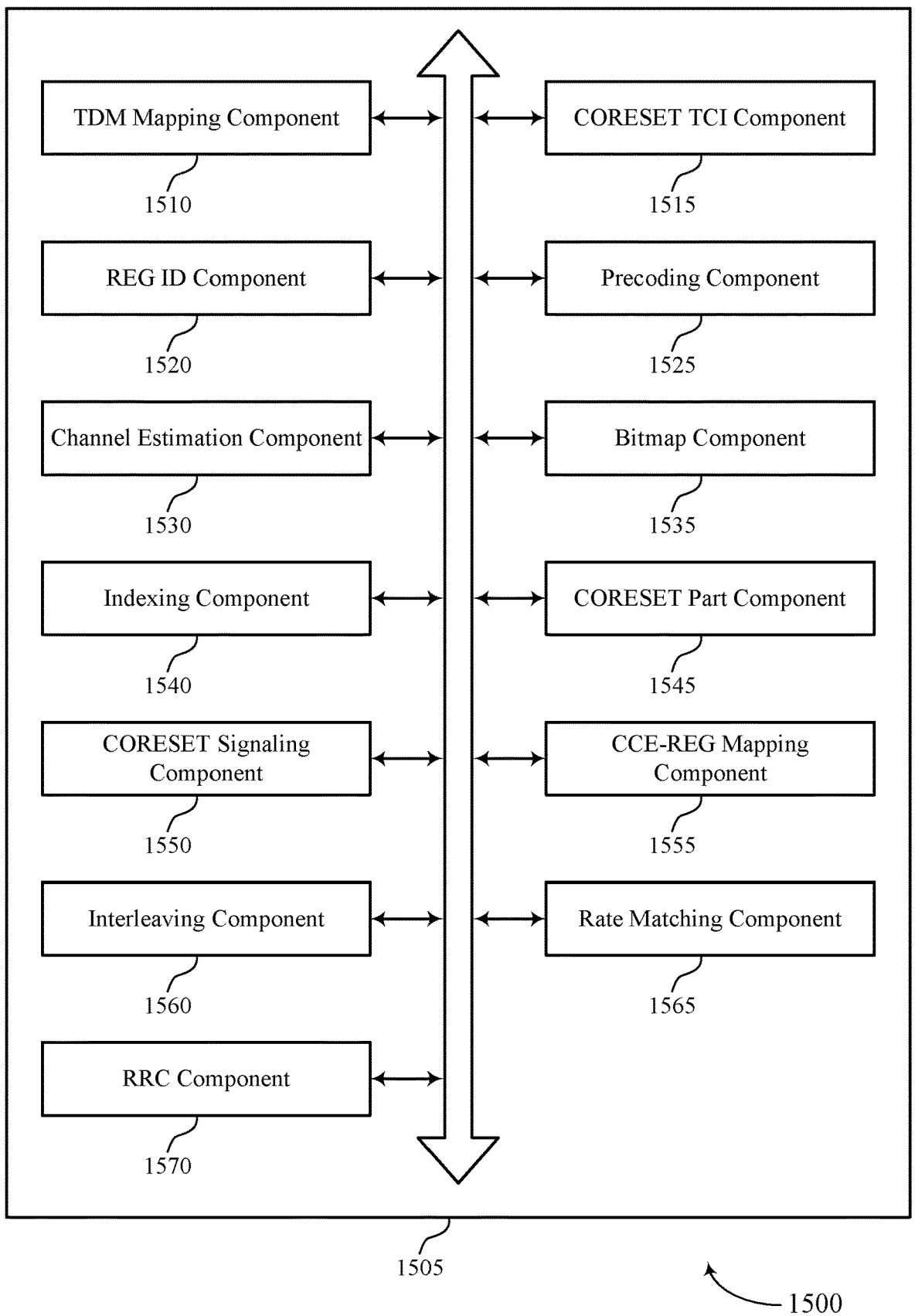
FIG. 15 shows a block diagram of a communications manager that supports time division multiplexing mapping of TCI states to a control channel in accordance with aspects of the present disclosure.

FIG. 15 shows a block diagram 1500 of a communications manager 1505 that supports time division multiplexing mapping of TCI states to a control channel in accordance with aspects of the present disclosure. The communications manager 1505 may be an example of aspects of a communications manager 1315, a communications manager 1415, or a communications manager 1610 described herein. The communications manager 1505 may include a TDM mapping component 1510, a CORESET TCI component 1515, a REG ID component 1520, a precoding component 1525, a channel estimation component 1530, a bitmap component 1535, an indexing component 1540, a CORESET part component 1545, a CORESET signaling component 1550, a CCE-REG mapping component 1555, an interleaving component 1560, a rate matching component 1565, and a RRC component 1570. Each of these modules may communicate, directly or indirectly, with one another (e.g., via one or more buses).

The TDM mapping component 1510 may identify an association between resources of the control resource set and the set of TCI states based on a time division multiplexing mapping.

In some examples, identifying that the time division multiplexing mapping includes a first association between a first set of orthogonal frequency division multiplexing (OFDM) symbols of the control resource set and a first TCI state of the set of TCI states, and a second association between a second set of OFDM symbols of the control resource set and a second TCI state of the set of TCI states.

The CORESET TCI component 1515 may transmit a configuration message indicating that the control resource set is associated with the set of TCI states. In some examples, the CORESET TCI component 1515 may transmit control signaling identifying a configuration for the control resource set including a number of the OFDM symbols for the first TCI state, a number of the OFDM symbols for the second TCI state, a number of symbols for switching from the first TCI state to the second TCI state, or a combination thereof. In some cases, the configuration information further includes a symbol duration and a symbol gap configured for the control resource set.

In some cases, the first set of OFDM symbols include a first portion of a total number of OFDM symbols of the control resource set, and the second set of OFDM symbols include a second portion of the total number of OFDM symbols of the control resource set. In some cases, the first set of OFDM symbols include a first portion of a total number of resource element group bundles of the control resource set, and the second set of OFDM symbols include a second portion of the total number of resource element group bundles of the control resource set.

The REG ID component 1520 may identify that the resources of the control resource set include a set of resource element group bundles spanning the set of OFDM symbols where each resource element group bundle of the set of resource element group bundles includes one or more sub-resource element group bundles, each of the one or more sub-resource element group bundles being associated with one of the first TCI state or the second TCI state. In some examples, the REG ID component 1520 may identify one or more resource element groups including a sub-resource element group bundle of the one or more sub-resource element group bundles.

The precoding component 1525 may identify that a precoding is common to the one or more resource element groups in the sub-resource element group bundle. The channel estimation component 1530 may perform a channel estimation for a PDCCH candidate in the control resource set based on the identifying.

The bitmap component 1535 may transmit control signaling including a bitmap indicating the first association between the first set of OFDM symbols of the control resource set and the first TCI state and the second association between the second set of OFDM symbols of the control resource set and the second TCI state. In some cases, the bitmap has a length equal to a duration of the control resource set.

The indexing component 1540 may index both the first set of resource element groups and the second set of resource element groups in a frequency-first, time-second manner. In some examples, the indexing component 1540 may define the first set of resource element group bundles and the second set of resource element group bundles.

In some examples, the indexing component 1540 may index the first set of resource element groups up to a threshold number of resource element groups in a frequency domain and in a time domain. In some examples, the indexing component 1540 may index the second set of resource element groups in the frequency domain and in the time domain.

In some examples, the indexing component 1540 may identify a set of indices for the set of control channel elements based on the PDCCH candidate. In some examples, the indexing component 1540 may identify a first index of the set of indices is associated with the first part of the control resource set, where the first index corresponds to a second index of the set of indices that is associated with the second part of the control resource set.

In some cases, each resource element group bundle from the first portion of resource element group bundles and the second portion of resource element group bundles include a number of consecutive resource element groups. In some cases, the threshold number includes a number of resource element groups in each resource element group bundle from the first portion of resource element group bundles or the second portion of resource element group bundles.

The CORESET part component 1545 may identify that the control resource set is organized into two parts, where the first association is between a first set of consecutive OFDM symbols and a first part of the control resource set, and where the second association is between a second set of consecutive OFDM symbols and a second part of the control resource set. In some examples, the CORESET part component 1545 may apply the time division multiplexing mapping independently across the first part of the control resource set and the second part of the control resource set based on the configuration information. In some cases, the first set of consecutive OFDM symbols and the second set of consecutive OFDM symbols have the same length.

The CORESET signaling component 1550 may transmit control signaling indicating configuration information for the control resource set. In some examples, the CORESET part component 1545 may identify an aggregation level for a PDCCH candidate associated with the first part of the control resource set or the second part of the control resource set.

In some cases, the number of control channel elements associated with the first part of the control resource set and the second part of the control resource set is based on the aggregation level from the PDCCH candidate.

The CCE-REG mapping component 1555 may identify a control channel element-to-resource element group bundle mapping between a set of control channel elements, a first set of resource element group bundles included in the first part of the control resource set, a second set of resource element group bundles included in the second part of the control resource set, or a combination thereof. In some examples, the CCE-REG mapping component 1555 may apply the control channel element-to-resource element group bundle mapping independently across the first part of the control resource set and the second part of the control resource set.

The interleaving component 1560 may identify an interleaving configuration for the control channel element-to-resource element group bundle mapping for the control resource set.

The rate matching component 1565 may identify a set of coded bits for a PDCCH candidate rate matching based on a first set of control channel elements of the PDCCH candidate included in the first part and a second set of control channel elements of the PDCCH candidate included in the second part. In some examples, the rate matching component 1565 may identify the set of coded bits is based on the number of control channel elements in the first set of control channel elements only. In some examples, the rate matching component 1565 may map the set of coded bits to a first set of control channel element indices associated with the PDCCH candidate according to the first part of the control resource set.

In some examples, the rate matching component 1565 may map the set of coded bits to the second set of control channel element indices associated with the PDCCH candidate according to the second part of the control resource set. In some examples, the rate matching component 1565 may identify the set of coded bits is based on the number of control channel elements in both the first set of control channel elements and the second set of control channel elements. In some examples, the rate matching component 1565 may map a first portion of the set of coded bits to a first set of control channel element indices associated with the PDCCH candidate according to the first part of the control resource set.

In some examples, the rate matching component 1565 may map a second portion of the set of coded bits to the second set of control channel element indices associated with the PDCCH candidate according to the second part of the control resource set.

The RRC component 1570 may transmit the configuration message to a UE. In some cases, the configuration message includes a radio resource control message.

Figure 16:
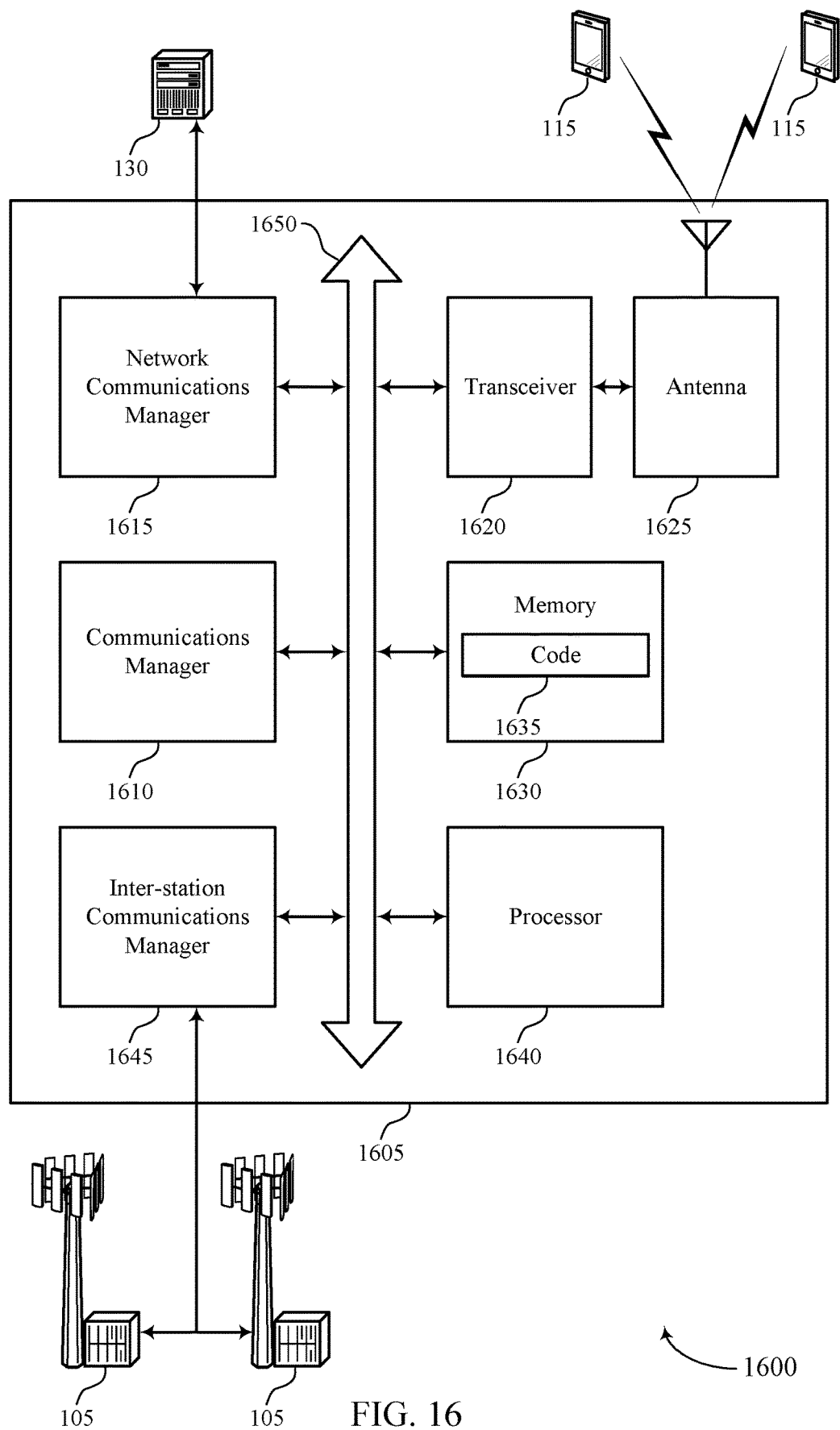
FIG. 16 shows a diagram of a system including a device that supports time division multiplexing mapping of TCI states to a control channel in accordance with aspects of the present disclosure.

FIG. 16 shows a diagram of a system 1600 including a device 1605 that supports time division multiplexing mapping of TCI states to a control channel in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may identify an association between resources of the control resource set and the set of TCI states based on a time division multiplexing mapping and transmit a configuration message indicating that the control resource set is associated with the set of TCI states.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described herein. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting time division multiplexing mapping of TCI states to a control channel).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
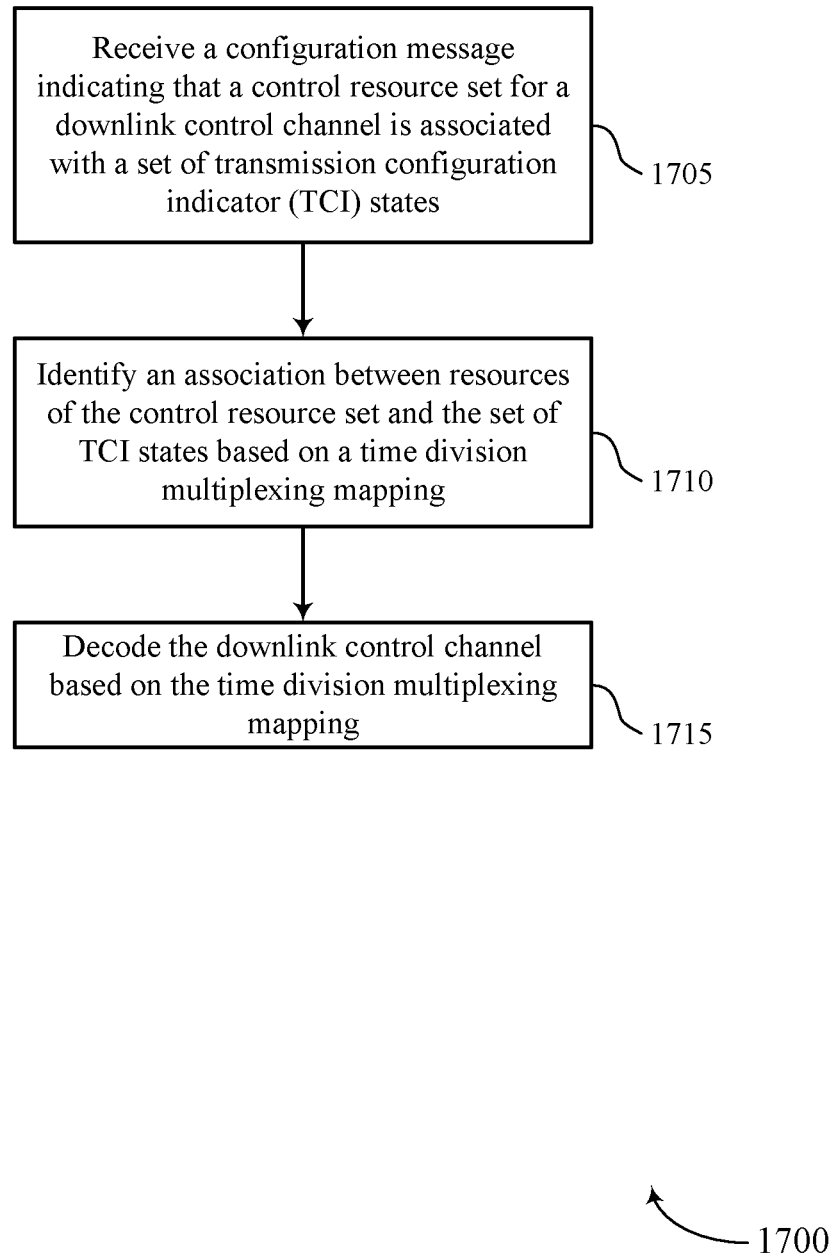
FIGS. 17 through 23 show flowcharts illustrating methods that support time division multiplexing mapping of TCI states to a control channel in accordance with aspects of the present disclosure.

FIG. 17 shows a flowchart illustrating a method 1700 that supports time division multiplexing mapping of TCI states to a control channel in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1705, the UE may receive a configuration message indicating that a control resource set for a downlink control channel is associated with a set of TCI states. The operations of 1705 may be performed according to the methods described herein. In some examples, aspects of the operations of 1705 may be performed by a CORESET TCI component as described with reference to FIGS. 9 through 12.

At 1710, the UE may identify an association between resources of the control resource set and the set of TCI states based on a time division multiplexing mapping. The operations of 1710 may be performed according to the methods described herein. In some examples, aspects of the operations of 1710 may be performed by a TDM mapping component as described with reference to FIGS. 9 through 12.

At 1715, the UE may decode the downlink control channel based on the time division multiplexing mapping. The operations of 1715 may be performed according to the methods described herein. In some examples, aspects of the operations of 1715 may be performed by a TDM mapping component as described with reference to FIGS. 9 through 12.

Figure 18:
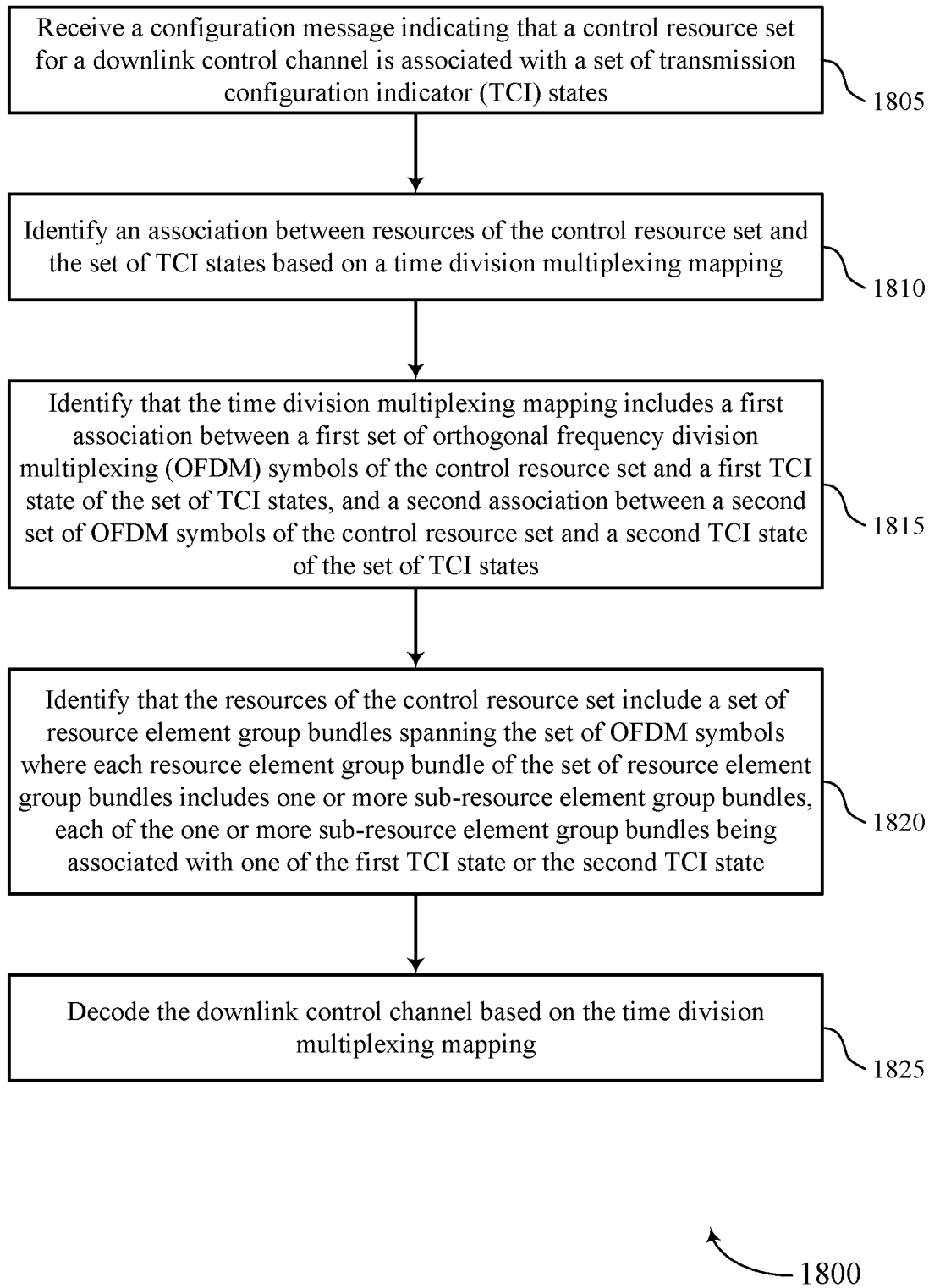

FIG. 18 shows a flowchart illustrating a method 1800 that supports time division multiplexing mapping of TCI states to a control channel in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1805, the UE may receive a configuration message indicating that a control resource set for a downlink control channel is associated with a set of TCI states. The operations of 1805 may be performed according to the methods described herein. In some examples, aspects of the operations of 1805 may be performed by a CORESET TCI component as described with reference to FIGS. 9 through 12.

At 1810, the UE may identify an association between resources of the control resource set and the set of TCI states based on a time division multiplexing mapping. The operations of 1810 may be performed according to the methods described herein. In some examples, aspects of the operations of 1810 may be performed by a TDM mapping component as described with reference to FIGS. 9 through 12.

At 1815, the UE may identify that the time division multiplexing mapping includes a first association between a first set of orthogonal frequency division multiplexing (OFDM) symbols of the control resource set and a first TCI state of the set of TCI states, and a second association between a second set of OFDM symbols of the control resource set and a second TCI state of the set of TCI states. The operations of 1815 may be performed according to the methods described herein. In some examples, aspects of the operations of 1815 may be performed by a TDM mapping component as described with reference to FIGS. 9 through 12.

At 1820, the UE may identify that the resources of the control resource set include a set of resource element group bundles spanning the set of OFDM symbols where each resource element group bundle of the set of resource element group bundles includes one or more sub-resource element group bundles, each of the one or more sub-resource element group bundles being associated with one of the first TCI state or the second TCI state. The operations of 1820 may be performed according to the methods described herein. In some examples, aspects of the operations of 1820 may be performed by a REG ID component as described with reference to FIGS. 9 through 12.

At 1825, the UE may decode the downlink control channel based on the time division multiplexing mapping. The operations of 1825 may be performed according to the methods described herein. In some examples, aspects of the operations of 1825 may be performed by a TDM mapping component as described with reference to FIGS. 9 through 12.

Figure 19:
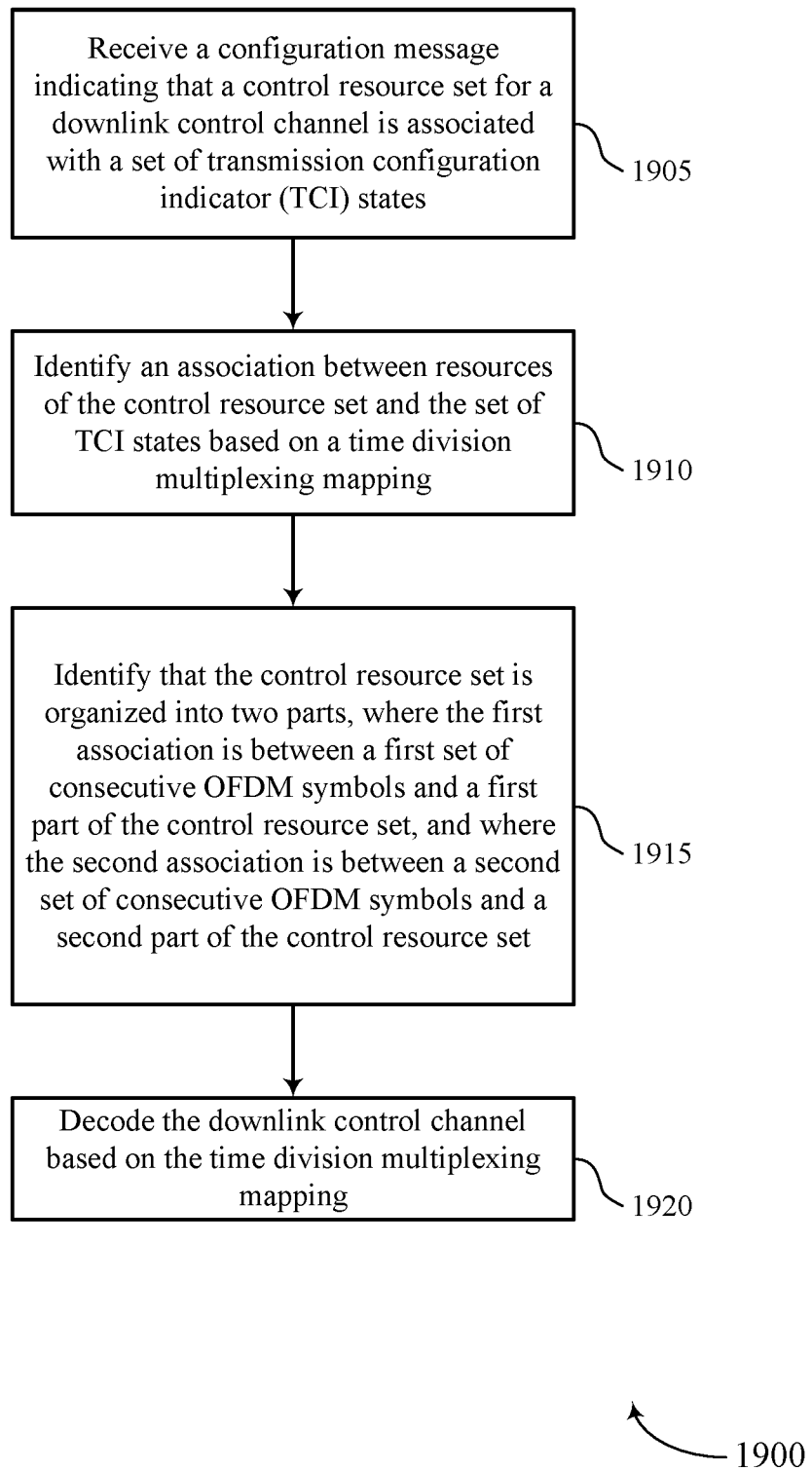

FIG. 19 shows a flowchart illustrating a method 1900 that supports time division multiplexing mapping of TCI states to a control channel in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1905, the UE may receive a configuration message indicating that a control resource set for a downlink control channel is associated with a set of TCI states. The operations of 1905 may be performed according to the methods described herein. In some examples, aspects of the operations of 1905 may be performed by a CORESET TCI component as described with reference to FIGS. 9 through 12.

At 1910, the UE may identify an association between resources of the control resource set and the set of TCI states based on a time division multiplexing mapping. The operations of 1910 may be performed according to the methods described herein. In some examples, aspects of the operations of 1910 may be performed by a TDM mapping component as described with reference to FIGS. 9 through 12.

At 1915, the UE may identify that the control resource set is organized into two parts, where the first association is between a first set of consecutive OFDM symbols and a first part of the control resource set, and where the second association is between a second set of consecutive OFDM symbols and a second part of the control resource set. The operations of 1915 may be performed according to the methods described herein. In some examples, aspects of the operations of 1915 may be performed by a CORESET part component as described with reference to FIGS. 9 through 12.

At 1920, the UE may decode the downlink control channel based on the time division multiplexing mapping. The operations of 1920 may be performed according to the methods described herein. In some examples, aspects of the operations of 1920 may be performed by a TDM mapping component as described with reference to FIGS. 9 through 12.

Figure 20:
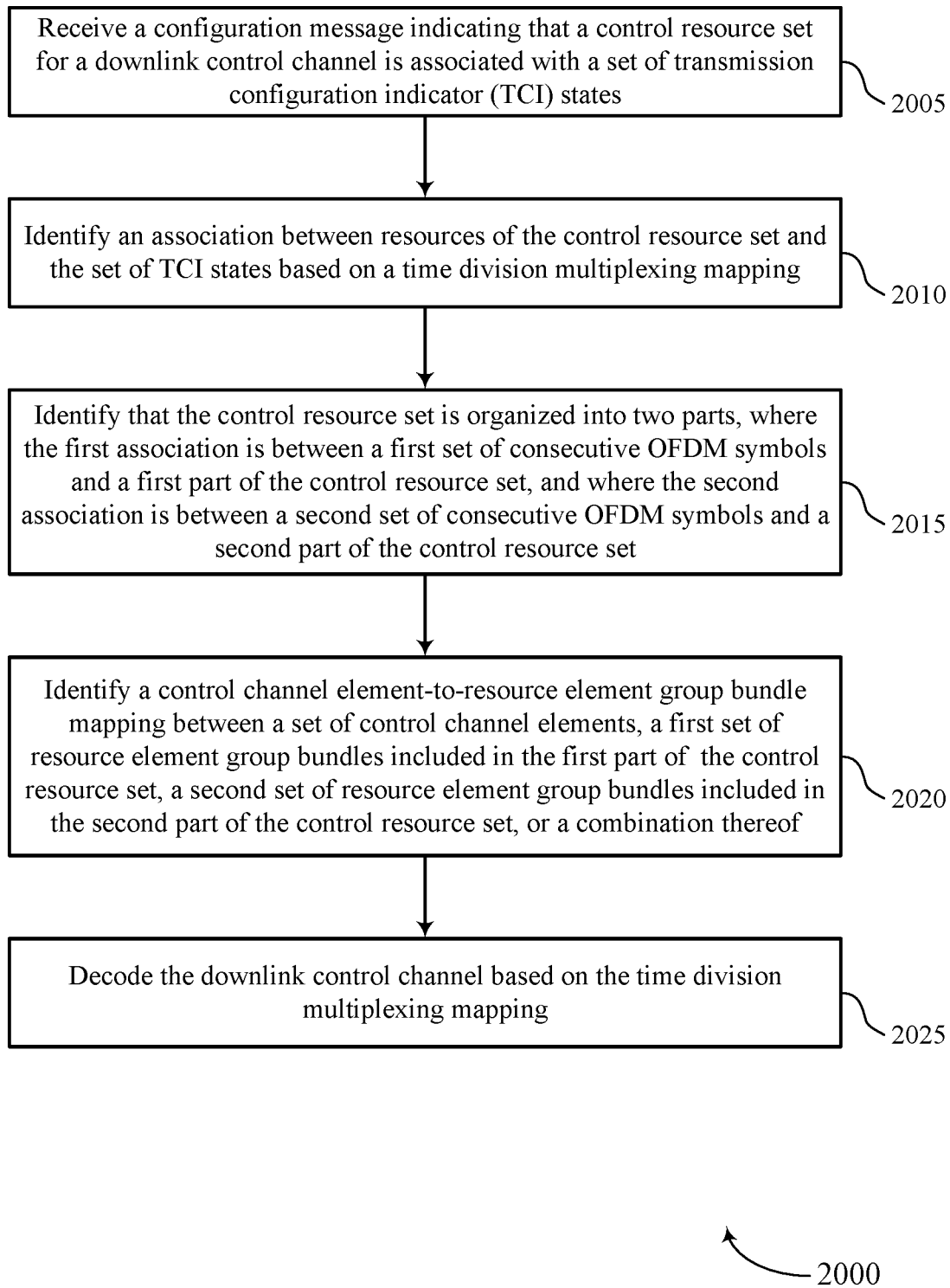

FIG. 20 shows a flowchart illustrating a method 2000 that supports time division multiplexing mapping of TCI states to a control channel in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 2005, the UE may receive a configuration message indicating that a control resource set for a downlink control channel is associated with a set of TCI states. The operations of 2005 may be performed according to the methods described herein. In some examples, aspects of the operations of 2005 may be performed by a CORESET TCI component as described with reference to FIGS. 9 through 12.

At 2010, the UE may identify an association between resources of the control resource set and the set of TCI states based on a time division multiplexing mapping. The operations of 2010 may be performed according to the methods described herein. In some examples, aspects of the operations of 2010 may be performed by a TDM mapping component as described with reference to FIGS. 9 through 12.

At 2015, the UE may identify that the control resource set is organized into two parts, where the first association is between a first set of consecutive OFDM symbols and a first part of the control resource set, and where the second association is between a second set of consecutive OFDM symbols and a second part of the control resource set. The operations of 2015 may be performed according to the methods described herein. In some examples, aspects of the operations of 2015 may be performed by a CORESET part component as described with reference to FIGS. 9 through 12.

At 2020, the UE may identify a control channel element-to-resource element group bundle mapping between a set of control channel elements, a first set of resource element group bundles included in the first part of the control resource set, a second set of resource element group bundles included in the second part of the control resource set, or a combination thereof. The operations of 2020 may be performed according to the methods described herein. In some examples, aspects of the operations of 2020 may be performed by a CCE-REG mapping component as described with reference to FIGS. 9 through 12.

At 2025, the UE may decode the downlink control channel based on the time division multiplexing mapping. The operations of 2025 may be performed according to the methods described herein. In some examples, aspects of the operations of 2025 may be performed by a TDM mapping component as described with reference to FIGS. 9 through 12.

Figure 21:
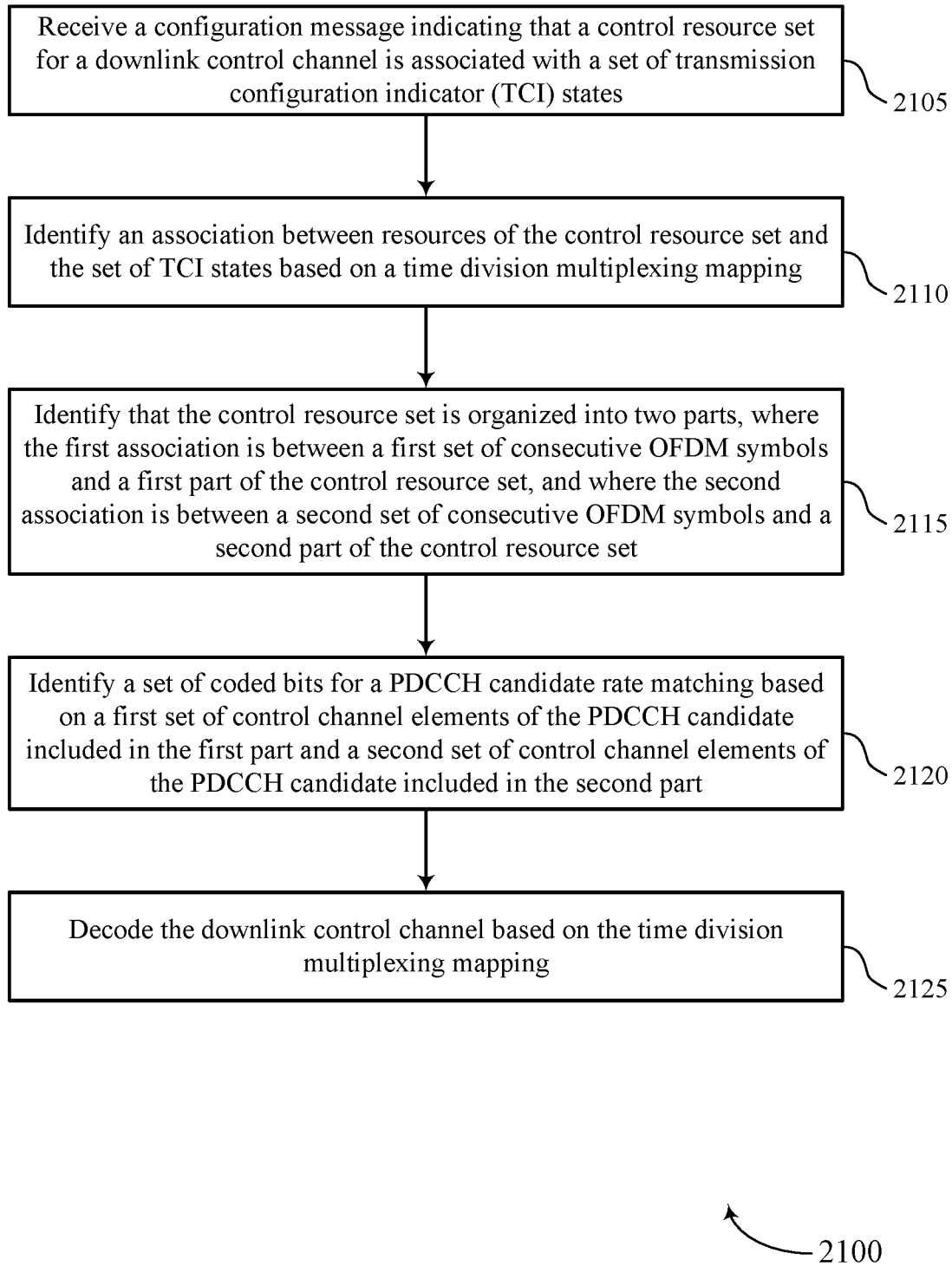

FIG. 21 shows a flowchart illustrating a method 2100 that supports time division multiplexing mapping of TCI states to a control channel in accordance with aspects of the present disclosure. The operations of method 2100 may be implemented by a UE 115 or its components as described herein. For example, the operations of method 2100 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 2105, the UE may receive a configuration message indicating that a control resource set for a downlink control channel is associated with a set of TCI states. The operations of 2105 may be performed according to the methods described herein. In some examples, aspects of the operations of 2105 may be performed by a CORESET TCI component as described with reference to FIGS. 9 through 12.

At 2110, the UE may identify an association between resources of the control resource set and the set of TCI states based on a time division multiplexing mapping. The operations of 2110 may be performed according to the methods described herein. In some examples, aspects of the operations of 2110 may be performed by a TDM mapping component as described with reference to FIGS. 9 through 12.

At 2115, the UE may identify that the control resource set is organized into two parts, where the first association is between a first set of consecutive OFDM symbols and a first part of the control resource set, and where the second association is between a second set of consecutive OFDM symbols and a second part of the control resource set. The operations of 2115 may be performed according to the methods described herein. In some examples, aspects of the operations of 2115 may be performed by a CORESET part component as described with reference to FIGS. 9 through 12.

At 2120, the UE may identify a set of coded bits for a PDCCH candidate rate matching based on a first set of control channel elements of the PDCCH candidate included in the first part and a second set of control channel elements of the PDCCH candidate included in the second part. The operations of 2120 may be performed according to the methods described herein. In some examples, aspects of the operations of 2120 may be performed by a rate matching component as described with reference to FIGS. 9 through 12.

At 2125, the UE may decode the downlink control channel based on the time division multiplexing mapping. The operations of 2125 may be performed according to the methods described herein. In some examples, aspects of the operations of 2125 may be performed by a TDM mapping component as described with reference to FIGS. 9 through 12.

Figure 22:
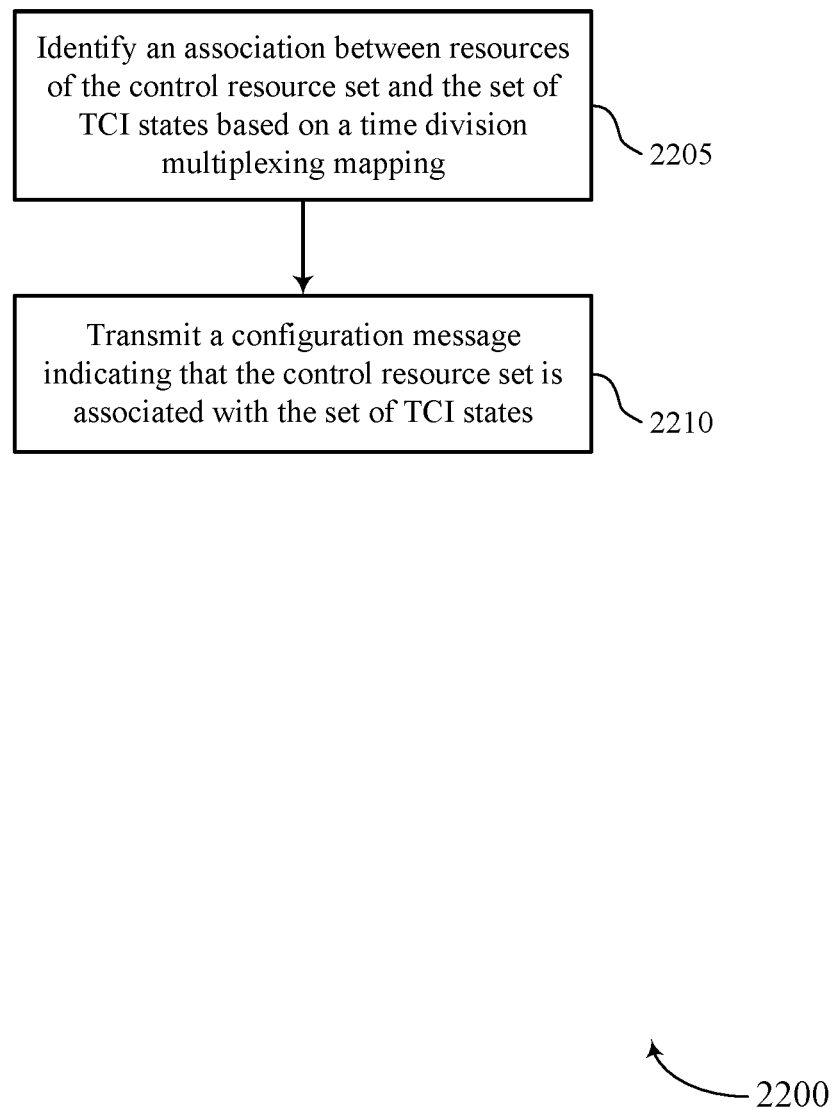

FIG. 22 shows a flowchart illustrating a method 2200 that supports time division multiplexing mapping of TCI states to a control channel in accordance with aspects of the present disclosure. The operations of method 2200 may be implemented by a base station 105 or its components as described herein. For example, the operations of method 2200 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2205, the base station may identify an association between resources of the control resource set and the set of TCI states based on a time division multiplexing mapping. The operations of 2205 may be performed according to the methods described herein. In some examples, aspects of the operations of 2205 may be performed by a TDM mapping component as described with reference to FIGS. 13 through 16.

At 2210, the base station may transmit a configuration message indicating that the control resource set is associated with the set of TCI states. The operations of 2210 may be performed according to the methods described herein. In some examples, aspects of the operations of 2210 may be performed by a CORESET TCI component as described with reference to FIGS. 13 through 16.

Figure 23:
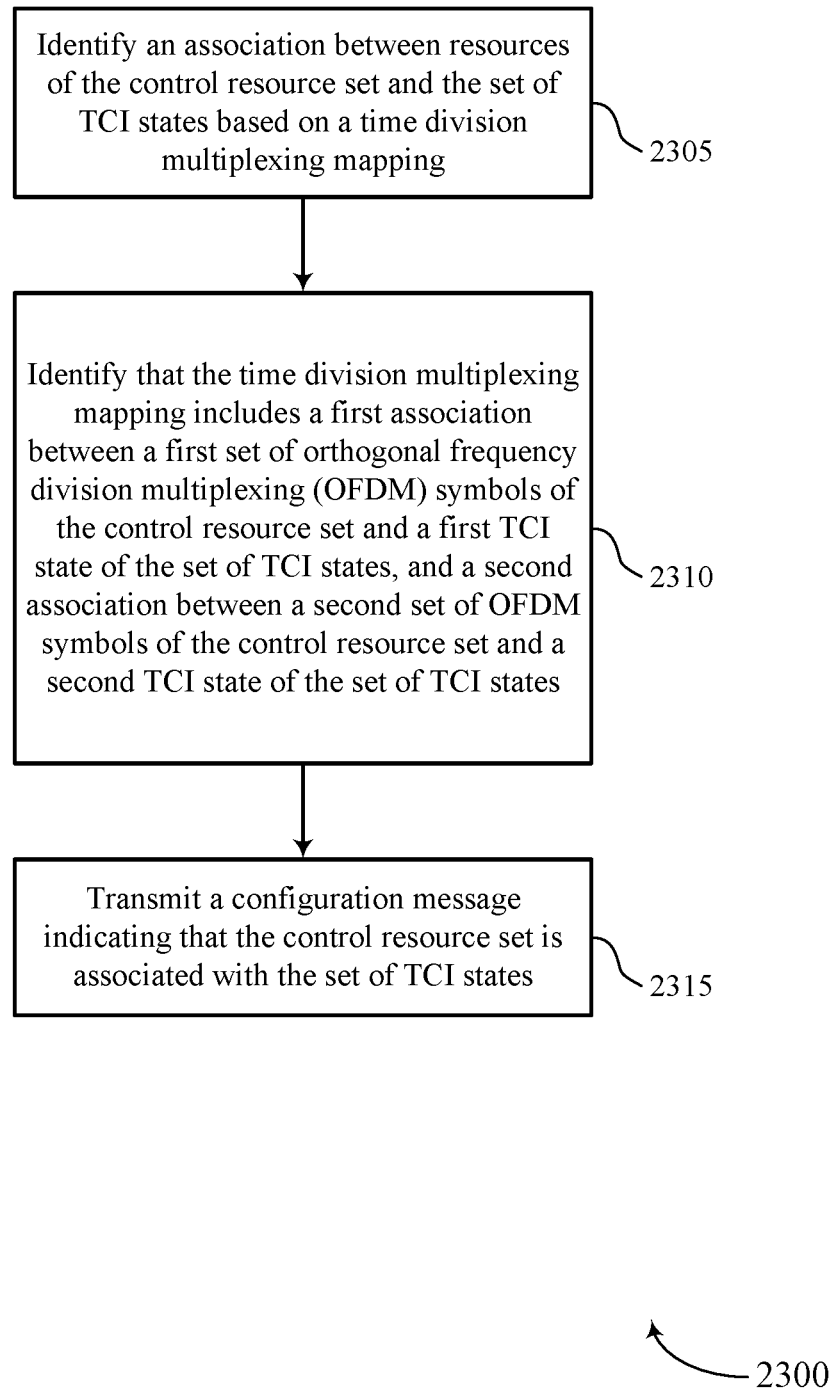

FIG. 23 shows a flowchart illustrating a method 2300 that supports time division multiplexing mapping of TCI states to a control channel in accordance with aspects of the present disclosure. The operations of method 2300 may be implemented by a base station 105 or its components as described herein. For example, the operations of method 2300 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2305, the base station may identify an association between resources of the control resource set and the set of TCI states based on a time division multiplexing mapping. The operations of 2305 may be performed according to the methods described herein. In some examples, aspects of the operations of 2305 may be performed by a TDM mapping component as described with reference to FIGS. 13 through 16.

At 2310, the base station may identify that the time division multiplexing mapping includes a first association between a first set of orthogonal frequency division multiplexing (OFDM) symbols of the control resource set and a first TCI state of the set of TCI states, and a second association between a second set of OFDM symbols of the control resource set and a second TCI state of the set of TCI states. The operations of 2310 may be performed according to the methods described herein. In some examples, aspects of the operations of 2310 may be performed by a TDM mapping component as described with reference to FIGS. 13 through 16.

At 2315, the base station may transmit a configuration message indicating that the control resource set is associated with the set of TCI states. The operations of 2315 may be performed according to the methods described herein. In some examples, aspects of the operations of 2315 may be performed by a CORESET TCI component as described with reference to FIGS. 13 through 16.

Summary of Aspects

The following provides an overview of aspects of the present disclosure:

Aspect 1: A method for wireless communications at a UE, comprising: receiving a configuration message indicating that a control resource set for a downlink control channel is associated with a plurality of transmission configuration indicator (TCI) states; identifying an association between resources of the control resource set and the plurality of TCI states based at least in part on a time division multiplexing mapping; and decoding the downlink control channel based at least in part on the time division multiplexing mapping.

Aspect 2: The method of aspect 1, wherein identifying the association between resources of the control resource set and the plurality of TCI states comprises: identifying that the control resource set is organized into two parts, wherein a first association is between a first set of consecutive OFDM symbols and a first part of the control resource set, and wherein a second association is between a second set of consecutive OFDM symbols and a second part of the control resource set.

Aspect 3: The method of aspect 2, wherein the first set of consecutive OFDM symbols and the second set of consecutive OFDM symbols have the same length.

Aspect 4: The method of any of aspects 2 through 3, further comprising: receiving control signaling indicating configuration information for the control resource set; and applying the time division multiplexing mapping independently across the first part of the control resource set and the second part of the control resource set based at least in part on the configuration information.

Aspect 5: The method of aspect 4, wherein the configuration information further comprises a symbol duration and a symbol gap configured for the control resource set.

Aspect 6: The method of any of aspects 2 through 5, further comprising: identifying a control channel element-to-resource element group bundle mapping between a plurality of control channel elements, a first set of resource element group bundles included in the first part of the control resource set, a second set of resource element group bundles included in the second part of the control resource set, or a combination thereof.

Aspect 7: The method of aspect 6, wherein the mapping further comprises: identifying an interleaving configuration for the control channel element-to-resource element group bundle mapping for the control resource set; and applying the control channel element-to-resource element group bundle mapping independently across the first part of the control resource set and the second part of the control resource set.

Aspect 8: The method of any of aspects 6 through 7, further comprising: identifying an aggregation level for a PDCCH candidate associated with the first part of the control resource set or the second part of the control resource set; and identifying a plurality of indices for the plurality of control channel elements based at least in part on the PDCCH candidate.

Aspect 9: The method of aspect 8, further comprising: identifying a first index of the plurality of indices is associated with the first part of the control resource set, wherein the first index corresponds to a second index of the plurality of indices that is associated with the second part of the control resource set.

Aspect 10: The method of any of aspects 8 through 9, wherein the plurality of control channel elements associated with the first part of the control resource set and the second part of the control resource set is based at least in part on the aggregation level from the PDCCH candidate.

Aspect 11: The method of any of aspects 2 through 10, further comprising: identifying a plurality of coded bits for a PDCCH candidate rate matching based at least in part on a first set of control channel elements of the PDCCH candidate included in the first part and a second set of control channel elements of the PDCCH candidate included in the second part.

Aspect 12: The method of aspect 11, further comprising: identifying the plurality of coded bits is based on a number of control channel elements in the first set of control channel elements only; mapping the plurality of coded bits to a first set of control channel element indices associated with the PDCCH candidate according to the first part of the control resource set; and mapping the plurality of coded bits to a second set of control channel element indices associated with the PDCCH candidate according to the second part of the control resource set.

Aspect 13: The method of any of aspects 11 through 12, further comprising: identifying the plurality of coded bits is based on a number of control channel elements in both the first set of control channel elements and the second set of control channel elements; mapping a first portion of the plurality of coded bits to a first set of control channel element indices associated with the PDCCH candidate according to the first part of the control resource set; and mapping a second portion of the plurality of coded bits to a second set of control channel element indices associated with the PDCCH candidate according to the second part of the control resource set.

Aspect 14: The method of any of aspects 1 through 13, wherein identifying the association between resources of the control resource set and the plurality of TCI states comprises: identifying that the time division multiplexing mapping comprises a first association between a first set of orthogonal frequency division multiplexing (OFDM) symbols of the control resource set and a first TCI state of the plurality of TCI states, and a second association between a second set of OFDM symbols of the control resource set and a second TCI state of the plurality of TCI states.

Aspect 15: The method of aspect 14, further comprising: identifying that the resources of the control resource set comprise a set of resource element group bundles spanning the first set of OFDM symbols and the second set of OFDM symbols, wherein each resource element group bundle of the set of resource element group bundles comprises one or more sub-resource element group bundles, each of the one or more sub-resource element group bundles being associated with one of the first TCI state or the second TCI state.

Aspect 16: The method of aspect 15, further comprising: identifying one or more resource element groups comprising a sub-resource element group bundle of the one or more sub-resource element group bundles; identifying that a precoding is common to the one or more resource element groups in the sub-resource element group bundle; and performing a channel estimation for a PDCCH candidate in the control resource set based at least in part on the identifying.

Aspect 17: The method of any of aspects 14 through 16, further comprising: receiving control signaling including a bitmap indicating the first association between the first set of OFDM symbols of the control resource set and the first TCI state and the second association between the second set of OFDM symbols of the control resource set and the second TCI state.

Aspect 18: The method of aspect 17, wherein the bitmap has a length equal to a duration of the control resource set.

Aspect 19: The method of any of aspects 14 through 18, further comprising: receiving control information identifying a configuration for the control resource set including a number of OFDM symbols for the first TCI state, a number of the OFDM symbols for the second TCI state, a number of symbols for switching from the first TCI state to the second TCI state, or a combination thereof.

Aspect 20: The method of any of aspects 14 through 19, wherein the first set of OFDM symbols comprise a first half of a total number of OFDM symbols of the control resource set, and the second set of OFDM symbols comprise a second half of the total number of OFDM symbols of the control resource set.

Aspect 21: The method of any of aspects 14 through 20, wherein the first set of OFDM symbols comprise a first portion of a total number of resource element group bundles of the control resource set, and the second set of OFDM symbols comprise a second portion of the total number of resource element group bundles of the control resource set.

Aspect 22: The method of aspect 21, further comprising: indexing both a first portion of resource element groups and a second portion of resource element groups in a frequency-first, time-second manner, wherein each resource element group bundle from the first portion of the total number of resource element group bundles and the second portion of the total number of resource element group bundles comprise a number of consecutive resource element groups.

Aspect 23: The method of any of aspects 14 through 22, wherein the first set of OFDM symbols comprise a first set of resource element groups and the second set of OFDM symbols comprise a second set of resource element groups, the method further comprising: indexing one or more resource element groups from the first set of resource element groups up to a threshold number of resource element groups; and indexing one or more different resource element groups from the second set of resource element groups up to the threshold number of resource element groups, wherein the indexing of the second set of resource element groups is continued from the indexing of the first set of resource element groups.

Aspect 24: The method of aspect 23, wherein the threshold number comprises a number of resource element groups in each resource element group bundle.

Aspect 25: A method for wireless communications at a base station, comprising: identifying an association between resources of the control resource set and the plurality of TCI states based at least in part on a time division multiplexing mapping; and transmitting a configuration message indicating that the control resource set is associated with the plurality of TCI states.

Aspect 26: The method of aspect 25, wherein identifying the association between resources of the control resource set and the plurality of TCI states comprises: identifying that the time division multiplexing mapping comprises a first association between a first set of orthogonal frequency division multiplexing (OFDM) symbols of the control resource set and a first TCI state of the plurality of TCI states, and a second association between a second set of OFDM symbols of the control resource set and a second TCI state of the plurality of TCI states.

Aspect 27: The method of aspect 26, further comprising: identifying that the resources of the control resource set comprise a set of resource element group bundles spanning the plurality of OFDM symbols wherein each resource element group bundle of the set of resource element group bundles comprises one or more sub-resource element group bundles, each of the one or more sub-resource element group bundles being associated with one of the first TCI state or the second TCI state.

Aspect 28: The method of aspect 27, further comprising: identifying one or more resource element groups comprising a sub-resource element group bundle of the one or more sub-resource element group bundles; identifying that a precoding is common to the one or more resource element groups in the sub-resource element group bundle; and performing a channel estimation for a PDCCH candidate in the control resource set based at least in part on the identifying.

Aspect 29: The method of any of aspects 26 through 28, further comprising: transmitting control signaling including a bitmap indicating the first association between the first set of OFDM symbols of the control resource set and the first TCI state and the second association between the second set of OFDM symbols of the control resource set and the second TCI state.

Aspect 30: The method of aspect 29, wherein the bitmap has a length equal to a duration of the control resource set.

Aspect 31: The method of any of aspects 26 through 30, further comprising: transmitting control signaling identifying a configuration for the control resource set including a number of the OFDM symbols for the first TCI state, a number of the OFDM symbols for the second TCI state, a number of symbols for switching from the first TCI state to the second TCI state, or a combination thereof.

Aspect 32: The method of any of aspects 26 through 31, wherein the first set of OFDM symbols comprise a first half of a total number of OFDM symbols of the control resource set, and the second set of OFDM symbols comprise a second half of the total number of OFDM symbols of the control resource set.

Aspect 33: The method of any of aspects 26 through 32, wherein the first set of OFDM symbols comprise a first half of a total number of resource element group bundles of the control resource set, and the second set of OFDM symbols comprise a second half of the total number of resource element group bundles of the control resource set.

Aspect 34: The method of aspect 33, further comprising: indexing both the first set of resource element groups and the second set of resource element groups in a frequency-first, time-second manner.

Aspect 35: The method of aspect 34, wherein each resource element group bundle from the first portion of resource element group bundles and the second portion of resource element group bundles comprise a number of consecutive resource element groups.

Aspect 36: The method of any of aspects 34 through 35, wherein the first set of OFDM symbols comprises a first set of resource element groups and the second set of OFDM symbols comprise a second set of resource element groups, the method further comprising: indexing one or more resource element groups from the first set of resource element groups up to a threshold number of resource element groups in a frequency domain and in a time domain; and indexing one or more different resource element groups from the second set of resource element groups in the frequency domain and in the time domain, wherein the indexing of the second set of resource element groups is continued from the indexing of the first set of resource element groups.

Aspect 37: The method of aspect 36, wherein the threshold number comprises a number of resource element groups in each resource element group bundle.

Aspect 38: The method of any of aspects 25 through 37, wherein identifying the association between resources of the control resource set and the plurality of TCI states comprises: identifying that the control resource set is organized into two parts, wherein the first association is between a first set of consecutive OFDM symbols and a first part of the control resource set, and wherein the second association is between a second set of consecutive OFDM symbols and a second part of the control resource set.

Aspect 39: The method of aspect 38, wherein the first set of consecutive OFDM symbols and the second set of consecutive OFDM symbols have the same length.

Aspect 40: The method of any of aspects 38 through 39, further comprising: transmitting control signaling indicating configuration information for the control resource set; and applying the time division multiplexing mapping independently across the first part of the control resource set and the second part of the control resource set based at least in part on the configuration information.

Aspect 41: The method of aspect 40, wherein the configuration information further comprises a symbol duration and a symbol gap configured for the control resource set.

Aspect 42: The method of any of aspects 38 through 41, further comprising: identifying a control channel element-to-resource element group bundle mapping between a plurality of control channel elements, a first set of resource element group bundles included in the first part of the control resource set, a second set of resource element group bundles included in the second part of the control resource set, or a combination thereof.

Aspect 43: The method of aspect 42, wherein the mapping further comprises: identifying an interleaving configuration for the control channel element-to-resource element group bundle mapping for the control resource set; and applying the control channel element-to-resource element group bundle mapping independently across the first part of the control resource set and the second part of the control resource set.

Aspect 44: The method of any of aspects 42 through 43, further comprising: identifying an aggregation level for a PDCCH candidate associated with the first part of the control resource set or the second part of the control resource set; and identifying a plurality of indices for the plurality of control channel elements based at least in part on the PDCCH candidate.

Aspect 45: The method of aspect 44, further comprising: identifying a first index of the plurality of indices is associated with the first part of the control resource set, wherein the first index corresponds to a second index of the plurality of indices that is associated with the second part of the control resource set.

Aspect 46: The method of any of aspects 44 through 45, wherein the number of control channel elements associated with the first part of the control resource set and the second part of the control resource set is based at least in part on the aggregation level from the PDCCH candidate.

Aspect 47: The method of any of aspects 38 through 46, further comprising: identifying a plurality of coded bits for a PDCCH candidate rate matching based at least in part on a first set of control channel elements of the PDCCH candidate included in the first part and a second set of control channel elements of the PDCCH candidate included in the second part.

Aspect 48: The method of aspect 47, further comprising: identifying the plurality of coded bits is based on the number of control channel elements in the first set of control channel elements only; mapping the plurality of coded bits to a first set of control channel element indices associated with the PDCCH candidate according to the first part of the control resource set; and mapping the plurality of coded bits to the second set of control channel element indices associated with the PDCCH candidate according to the second part of the control resource set.

Aspect 49: The method of any of aspects 47 through 48, further comprising: identifying the plurality of coded bits is based on the number of control channel elements in both the first set of control channel elements and the second set of control channel elements; mapping a first portion of the plurality of coded bits to a first set of control channel element indices associated with the PDCCH candidate according to the first part of the control resource set; and mapping a second portion of the plurality of coded bits to the second set of control channel element indices associated with the PDCCH candidate according to the second part of the control resource set.

Aspect 50: The method of any of aspects 25 through 49, wherein the configuration message comprises a radio resource control message.

Aspect 51: An apparatus for wireless communications at a UE, comprising a processor; memory coupled with the processor; and instructions stored in the memory and executable by the processor to cause the apparatus to perform a method of any of aspects 1 through 24.

Aspect 52: An apparatus for wireless communications at a UE, comprising at least one means for performing a method of any of aspects 1 through 24.

Aspect 53: A non-transitory computer-readable medium storing code for wireless communications at a UE, the code comprising instructions executable by a processor to perform a method of any of aspects 1 through 24.

Aspect 54: An apparatus for wireless communications at a base station, comprising a processor; memory coupled with the processor; and instructions stored in the memory and executable by the processor to cause the apparatus to perform a method of any of aspects 25 through 50.

Aspect 55: An apparatus for wireless communications at a base station, comprising at least one means for performing a method of any of aspects 25 through 50.

Aspect 56: A non-transitory computer-readable medium storing code for wireless communications at a base station, the code comprising instructions executable by a processor to perform a method of any of aspects 25 through 50.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving a configuration message indicating that one or more sub-groups of resources within a plurality of groups of resources of a control resource set for a downlink control channel are associated with a plurality of transmission configuration indicator (TCI) states based at least in part on a time division multiplexing mapping, wherein the one or more sub-groups of resources comprise one or more sets of orthogonal frequency division multiplexing (OFDM) symbols of the control resource set; and
    decoding the downlink control channel based at least in part on the time division multiplexing mapping, wherein the time division multiplexing mapping comprises a first association between a first set of OFDM symbols of the control resource set and a first TCI state of the plurality of TCI states, and a second association between a second set of OFDM symbols of the control resource set and a second TCI state of the plurality of TCI states.

2. The method of claim 1, further comprising:
    identifying that the control resource set is organized into two parts, wherein the first association is between a first set of consecutive OFDM symbols and a first part of the control resource set, and wherein the second association is between a second set of consecutive OFDM symbols and a second part of the control resource set.

3. The method of claim 2, wherein the first set of consecutive OFDM symbols and the second set of consecutive OFDM symbols have a same length.

4. The method of claim 2, further comprising:
    receiving control signaling indicating configuration information for the control resource set; and
    applying the time division multiplexing mapping independently across the first part of the control resource set and the second part of the control resource set based at least in part on the configuration information.

5. The method of claim 4, wherein the configuration information further comprises a symbol duration and a symbol gap configured for the control resource set.

6. The method of claim 2, further comprising:
    identifying a control channel element-to-resource element group bundle mapping between a plurality of control channel elements, a first set of resource element group bundles included in the first part of the control resource set, a second set of resource element group bundles included in the second part of the control resource set, or a combination thereof.

7. The method of claim 6, wherein the time division multiplexing mapping further comprises:
identifying an interleaving configuration for the control channel element-to-resource element group bundle mapping for the control resource set; and
applying the control channel element-to-resource element group bundle mapping independently across the first part of the control resource set and the second part of the control resource set.

8. The method of claim 6, further comprising:
identifying an aggregation level for a physical downlink control channel (PDCCH) candidate associated with the first part of the control resource set or the second part of the control resource set; and
identifying a plurality of indices for the plurality of control channel elements based at least in part on the PDCCH candidate.

9. The method of claim 8, further comprising:
identifying a first index of the plurality of indices is associated with the first part of the control resource set, wherein the first index corresponds to a second index of the plurality of indices that is associated with a second part of the control resource set.

10. The method of claim 8, wherein the plurality of control channel elements associated with the first part of the control resource set and the second part of the control resource set is based at least in part on the aggregation level from the PDCCH candidate.

11. The method of claim 2, further comprising:
identifying a plurality of coded bits for a physical downlink control channel (PDCCH) candidate rate matching based at least in part on a first set of control channel elements of the PDCCH candidate included in the first part and a second set of control channel elements of the PDCCH candidate included in the second part.

12. The method of claim 11, further comprising:
identifying the plurality of coded bits is based on a number of control channel elements in the first set of control channel elements only;
mapping the plurality of coded bits to a first set of control channel element indices associated with the PDCCH candidate according to the first part of the control resource set; and
mapping the plurality of coded bits to a second set of control channel element indices associated with the PDCCH candidate according to the second part of the control resource set.

13. The method of claim 11, further comprising:
identifying the plurality of coded bits is based on a number of control channel elements in both the first set of control channel elements and the second set of control channel elements;
mapping a first portion of the plurality of coded bits to a first set of control channel element indices associated with the PDCCH candidate according to the first part of the control resource set; and
mapping a second portion of the plurality of coded bits to a second set of control channel element indices associated with the PDCCH candidate according to the second part of the control resource set.

14. The method of claim 1, wherein the plurality of groups of resources of the control resource set comprise a set of resource element group bundles spanning the first set of OFDM symbols and the second set of OFDM symbols, wherein each resource element group bundle of the set of resource element group bundles comprises one or more sub-resource element group bundles that are the one or more sub-groups of resources, each of the one or more sub-resource element group bundles being associated with one of the first TCI state or the second TCI state.

15. The method of claim 14, further comprising:
identifying one or more resource element groups comprising a sub-resource element group bundle of the one or more sub-resource element group bundles;
identifying that a precoding is common to the one or more resource element groups in the sub-resource element group bundle; and
performing a channel estimation for a physical downlink control channel (PDCCH) candidate in the control resource set based at least in part on the precoding.

16. The method of claim 1, further comprising:
receiving control signaling including a bitmap indicating the first association between the first set of OFDM symbols of the control resource set and the first TCI state and the second association between the second set of OFDM symbols of the control resource set and the second TCI state.

17. The method of claim 16, wherein the bitmap has a length equal to a duration of the control resource set.

18. The method of claim 1, further comprising:
receiving control information identifying a configuration for the control resource set including a first quantity of OFDM symbols for the first TCI state, a second quantity of the OFDM symbols for the second TCI state, a number of symbols for switching from the first TCI state to the second TCI state, or a combination thereof.

19. The method of claim 1, wherein the first set of OFDM symbols comprise a first half of a total number of OFDM symbols of the control resource set, and the second set of OFDM symbols comprise a second half of the total number of OFDM symbols of the control resource set.

20. The method of claim 1, wherein the first set of OFDM symbols comprise a first portion of a total number of resource element group bundles of the control resource set, and the second set of OFDM symbols comprise a second portion of the total number of resource element group bundles of the control resource set.

21. The method of claim 20, further comprising:
indexing both a first set of resource element groups and a second set of resource element groups in a frequency-first, time-second manner, wherein each resource element group bundle from the first portion of the total number of resource element group bundles and the second portion of the total number of resource element group bundles comprise a number of consecutive resource element groups.

22. The method of claim 1, wherein the first set of OFDM symbols comprise a first set of resource element groups and the second set of OFDM symbols comprise a second set of resource element groups, the method further comprising:
indexing one or more resource element groups from the first set of resource element groups up to a threshold number of resource element groups; and
indexing one or more different resource element groups from the second set of resource element groups up to the threshold number of resource element groups, wherein the indexing of the second set of resource element groups is continued from the indexing of the first set of resource element groups.

23. The method of claim 22, wherein the threshold number of resource element groups comprises a number of resource element groups in each resource element group bundle.

24. A method for wireless communications at a network entity, comprising:
- transmitting a configuration message indicating that one or more sub-groups of resources within a plurality of groups of resources of a control resource set for a downlink control channel are associated with a plurality of transmission configuration indicator (TCI) states based at least in part on a time division multiplexing mapping, wherein the one or more sub-groups of resources comprise one or more sets of orthogonal frequency division multiplexing (OFDM) symbols of the control resource set; and
- transmitting the downlink control channel based at least in part on the time division multiplexing mapping, wherein the time division multiplexing mapping comprises a first association between a first set of OFDM symbols of the control resource set and a first TCI state of the plurality of TCI states, and a second association between a second set of OFDM symbols of the control resource set and a second TCI state of the plurality of TCI states.

25. The method of claim 24, further comprising:
- identifying that the control resource set is organized into two parts, wherein the first association is between a first set of consecutive OFDM symbols and a first part of the control resource set, and wherein the second association is between a second set of consecutive OFDM symbols and a second part of the control resource set.

26. The method of claim 25, further comprising:
- transmitting control signaling indicating configuration information for the control resource set; and
- applying the time division multiplexing mapping independently across the first part of the control resource set and the second part of the control resource set based at least in part on the configuration information.

27. The method of claim 25, further comprising:
- identifying a control channel element-to-resource element group bundle mapping between a plurality of control channel elements, a first portion of resource element group bundles included in the first part of the control resource set, a second portion of resource element group bundles included in the second part of the control resource set, or a combination thereof.

28. An apparatus for wireless communications at a user equipment (UE), comprising:
- at least one processor,
- at least one memory coupled with the at least one processor; and
- instructions stored in the at least one memory and executable by the at least one processor to cause the apparatus to:
  - receive a configuration message indicating that one or more sub-groups of resources within a plurality of groups of resources of a control resource set for a downlink control channel are associated with a plurality of transmission configuration indicator (TCI) states based at least in part on a time division multiplexing mapping, wherein the one or more sub-groups of resources comprise one or more sets of orthogonal frequency division multiplexing (OFDM) symbols of the control resource set; and
  - decode the downlink control channel based at least in part on the time division multiplexing mapping, wherein the time division multiplexing mapping comprises a first association between a first set of OFDM symbols of the control resource set and a first TCI state of the plurality of TCI states, and a second association between a second set of OFDM symbols of the control resource set and a second TCI state of the plurality of TCI states.

29. An apparatus for wireless communications at a base station, comprising:
- at least one processor,
- at least one memory coupled with the at least one processor; and
- instructions stored in the at least one memory and executable by the at least one processor to cause the apparatus to:
  - transmit a configuration message indicating that one or more sub-groups of resources within a plurality of groups of resources of a control resource set for a downlink control channel are associated with a plurality of transmission configuration indicator (TCI) states based at least in part on a time division multiplexing mapping, wherein the one or more sub-groups of resources comprise one or more sets of orthogonal frequency division multiplexing (OFDM) symbols of the control resource set; and
  - transmit the downlink control channel based at least in part on the time division multiplexing mapping, wherein the time division multiplexing mapping comprises a first association between a first set of OFDM symbols of the control resource set and a first TCI state of the plurality of TCI states, and a second association between a second set of OFDM symbols of the control resource set and a second TCI state of the plurality of TCI states.

* * * * *